(12) United States Patent
Lee et al.

(10) Patent No.: US 10,990,444 B2
(45) Date of Patent: Apr. 27, 2021

(54) DEVICE AND METHOD FOR CONTROLLING DATA REQUEST

(71) Applicant: Samsung Electronics Co., Ltd., Suwon-si (KR)

(72) Inventors: Seung-Beom Lee, Uiwang-si (KR); Ahmed Alif, Rajshahi (BD); Joongbaik Kim, Seoul (KR); Soon-Wan Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 15/774,173

(22) PCT Filed: Nov. 2, 2016

(86) PCT No.: PCT/KR2016/012514
§ 371 (c)(1),
(2) Date: May 7, 2018

(87) PCT Pub. No.: WO2017/078396
PCT Pub. Date: May 11, 2017

(65) Prior Publication Data
US 2019/0205169 A1     Jul. 4, 2019

(30) Foreign Application Priority Data
Nov. 6, 2015    (KR) .................. 10-2015-0155995

(51) Int. Cl.
    *G06F 15/16*     (2006.01)
    *G06F 9/48*     (2006.01)
    (Continued)

(52) U.S. Cl.
    CPC .......... *G06F 9/4887* (2013.01); *G06F 9/5038* (2013.01); *G06F 13/10* (2013.01);
    (Continued)

(58) Field of Classification Search
    CPC ....... G06F 9/4887; G06F 9/5038; G06F 13/10
    (Continued)

(56) References Cited

U.S. PATENT DOCUMENTS 9,164,886 B1    10/2015    Phan
2004/0059879 A1    3/2004    Rogers
(Continued)

FOREIGN PATENT DOCUMENTS

WO    2012/110779 A1    8/2012

OTHER PUBLICATIONS

Extended European Search Report dated Oct. 31, 2018, issued in European Application No. 16862412.0.
(Continued)

*Primary Examiner* — Duyen M Doan
(74) *Attorney, Agent, or Firm* — Jefferson IP Law, LLP

(57) ABSTRACT

A device according to various embodiments may comprise: a transceiver unit configured to transmit or receive information; and a control unit operatively coupled to the transceiver unit, wherein the control unit may be configured to receive, from each of a plurality of control devices that transmit a request for data to a storage device, state information of each of the plurality of control devices, to determine a threshold value for an outstanding data request of each of the plurality of control devices on the basis of the received state information, and to transmit the threshold value to at least one other device.

20 Claims, 25 Drawing Sheets

(51) Int. Cl.
*G06F 13/10* (2006.01)
*G06F 13/38* (2006.01)
*G06F 13/18* (2006.01)
*G06F 13/22* (2006.01)
*G06F 13/40* (2006.01)
*G06F 13/362* (2006.01)
*G06F 13/16* (2006.01)
*G06F 9/50* (2006.01)
*H04L 29/08* (2006.01)

(52) U.S. Cl.
CPC .......... *G06F 13/1642* (2013.01); *G06F 13/18* (2013.01); *G06F 13/22* (2013.01); *G06F 13/362* (2013.01); *G06F 13/38* (2013.01); *G06F 13/40* (2013.01); *H04L 67/025* (2013.01)

(58) Field of Classification Search
USPC .................................................. 709/203, 208
See application file for complete search history.

(56) References Cited

U.S. PATENT DOCUMENTS

| | | | |
|---|---|---|---|
| 2006/0149874 | A1* | 7/2006 | Ganasan ............... G06F 13/364 |
| | | | 710/110 |
| 2008/0005513 | A1 | 1/2008 | Lim |
| 2009/0138670 | A1 | 5/2009 | Mutlu et al. |
| 2009/0248917 | A1* | 10/2009 | Kalos ..................... G06F 3/061 |
| | | | 710/39 |
| 2010/0061233 | A1 | 3/2010 | Golwalkar et al. |
| 2011/0246688 | A1 | 10/2011 | Vaz et al. |
| 2011/0258353 | A1 | 10/2011 | Wang |
| 2012/0317322 | A1 | 12/2012 | Chirca et al. |
| 2013/0159633 | A1 | 6/2013 | Lilly |
| 2013/0246727 | A1 | 9/2013 | Hikono |
| 2014/0189700 | A1 | 7/2014 | Williams et al. |
| 2014/0282588 | A1* | 9/2014 | Suzuki .................. G06F 9/5044 |
| | | | 718/104 |
| 2019/0268706 | A1* | 8/2019 | Solum .................. H04R 25/554 |

OTHER PUBLICATIONS

European Search Report dated Apr. 15, 2020, issued in European Patent Application No. 16 862 412.0.

* cited by examiner

Normal Mode

Upgrade priority

| | Priority value | | Updated priority value |
|---|---|---|---|
| First data request (911) | 3 | 3 | 6 |
| Second data request (912) | 2 | 3 | 5 |
| Third data request (913) | 1 | 3 | 4 |
| Fourth data request (914) | 0 | | 0 |

FIG.9A

| | Normal Mode | | |
|---|---|---|---|
| | Priority value | Upgrade priority | Updated priority value |
| First data request (921) | 3 | 1 | 4 |
| Second data request (922) | 2 | 1 | 3 |
| Third data request (923) | 1 | 1 | 2 |
| Fourth data request (924) | 0 | 1 | 1 |

FIG.9B

|  | Normal Mode | | |
|---|---|---|---|
|  | Priority value | Upgrade priority | Updated priority value |
| First data request (931) | 3 | 4 | 7 |
| Second data request (932) | 2 | 0 | 2 |
| Third data request (933) | 1 | 0 | 1 |
| Fourth data request (934) | 0 | 0 | 0 |

FIG.9C

DEVICE AND METHOD FOR CONTROLLING DATA REQUEST

TECHNICAL FIELD

Embodiments below relate to the control of a data request.

BACKGROUND ART

With the development of digital technology in recent years, various types of electronic devices, such as a mobile communication terminal, a smartphone, a tablet computer, a Personal Computer (PC), a Personal Digital Assistant (PDA), an electronic organizer, a notebook computer, and a wearable device, are widely used. The electronic devices have been evolving to encompass the functions of other devices through mobile convergence. For example, an electronic device may provide a call function for voice and video calls, a message-transmitting/receiving function for Short Messaging Service (SMS)/Multimedia Messaging Service (MMS) and e-mail, an electronic organizer function, a photographing function, a broadcast playback function, a video playback function, a music playback function, an Internet function, a messenger function, a gaming function, or a Social Networking Service (SNS) function.

Various functions provided by the electronic devices may be implemented through various control devices. The various control devices may generate a variety of data requests to implement various functions.

DETAILED DESCRIPTION OF THE INVENTION

Technical Problem

Embodiments below are to provide a device and a method for controlling various data requests that are generated in an electronic device.

Technical Solution

A method for operating a first device according to various embodiments may include: receiving state information on each of a plurality of control devices from each of the plurality of control devices requesting data from a storage device; determining a threshold value for an outstanding data request for each of the plurality of control devices on the basis of the received state information; and transmitting the determined threshold value to at least one another device.

A method for operating a second device according to various embodiments may include: receiving a data request from a control device; determining whether to transmit the data request on the basis of information related to the data request received from another device; and transmitting the data request to a storage device on the basis of a determination to transmit the data request, wherein the information related to the data request may be determined on the basis of state information on the control device.

A first device according to various embodiments may include: a transceiver configured to transmit or receive information; and a controller configured to be operatively coupled to the transceiver, wherein the controller may be configured to: receive state information on each of a plurality of control devices from each of the plurality of control devices requesting data from a storage device; determine a threshold value for an outstanding data request for each of the plurality of control devices on the basis of the received state information; and transmit the determined threshold value to at least one another device.

A second device according to various embodiments may include: a transceiver configured to transmit or receive information; and a controller configured to be operatively coupled to the transceiver, wherein the controller may be configured to: receive a data request from a control device; determine whether to transmit the data request on the basis of information related to the data request received from another device; and transmit the data request to a storage device on the basis of a determination to transmit the data request, and the information related to the data request may be determined on the basis of state information on the control device.

An electronic device according to various embodiments may include: a first device to determine a threshold value used to process a data request relating to a storage device that is generated in a control device; and a second device to transmit the data request to the storage device when the number of outstanding data requests of the control device is less than the threshold value, wherein the threshold value may be determined on the basis of state information on the control device.

Advantageous Effects

An electronic device and an operation method thereof according to various embodiments may control a data request, thereby improving the performance of a control device.

BRIEF DESCRIPTION OF THE DRAWINGS

The following detailed description will be made with reference to the accompanying drawings for a better understanding of the present disclosure. Like reference numerals refer to like components throughout the drawings.

FIGS. 9A to 9E illustrate an example of updating a data request priority value according to various embodiments;

MODE FOR CARRYING OUT THE INVENTION

Figure 1:
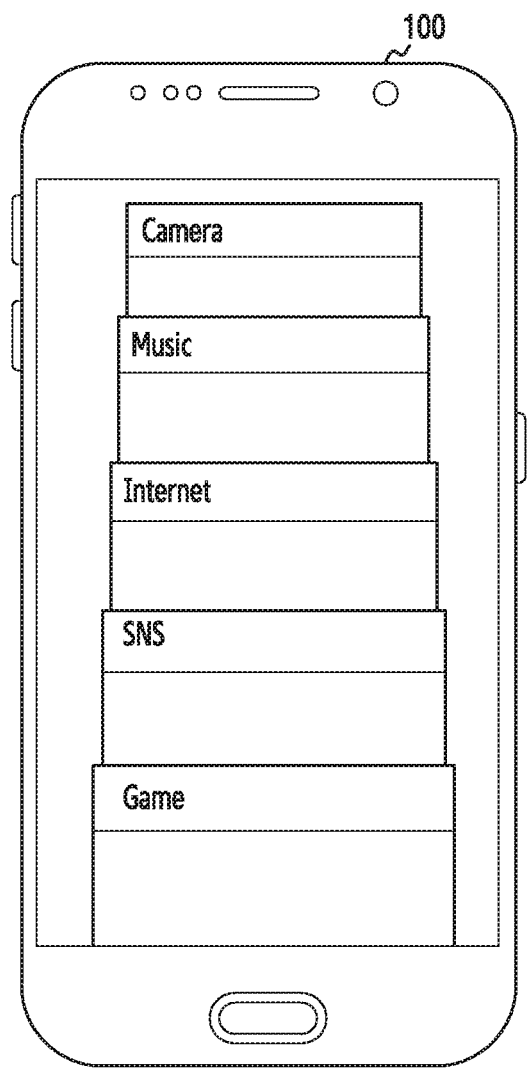
FIG. 1 illustrates an electronic device that executes a plurality of applications according to various embodiments.

Hereinafter, various embodiments will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

Master devices included in an electronic device may request data from slave devices through an interconnector. For example, at least one master device may transmit a read request to at least one slave device. The master devices may process the data provided from the slave devices and may provide the processed data to the slave devices for storage. For example, at least one master device may transmit a write request to at least one slave device.

After requesting data, the master devices may wait to receive data from the slave devices. However, it may take from a few cycles to several tens to several hundreds of cycles for the data requested by the master devices to be provided to the master devices from the slave devices via the interconnector. The cycle may be a time unit defined according to the predefined unit. For example, one cycle may be defined on the basis of a clock used for the operations of the master devices and the slave devices. Therefore, a device and a method for reducing time taken to provide data from the slave devices may be sought so that each of the master devices may continuously perform data processing. The master devices may be designed to include a buffer to store data therein, thereby making a next data request before a response to a data request is completed.

The amount of data needed by each of the master devices may vary depending on the operation scenario of the electronic device. The operation scenario may be a series of pieces of data processing needed to perform functions required depending on the application being executed. The scenario may be a series of operations or a set of operations corresponding to the application. The scenario may be a concept involving details required for each control device to process. Each of the master devices may process data using different amounts of time depending on the particular operation scenario. Some of the master devices may perform continuous data processing, while others may not perform continuous data processing. When a master device that continuously performs data processing and a master device that does not continuously perform data processing competitively request data from the slave devices, data may not be provided at a necessary time, and thus some of the master devices requesting data may interrupt data processing. This interruption of data processing may cause the performance of the electronic device to be reduced.

A device and an operation method thereof according to various embodiments may control a request for excessive data from a master device that does not need continuous data processing. An electronic device and an operation method thereof according to various embodiments may control a data request so that processing may be completed within a time defined in a data processing scenario of various master devices.

FIG. 1 illustrates an electronic device (user equipment: UE) that executes a plurality of applications according to various embodiments.

Referring to FIG. 1, the electronic device 100 may execute a plurality of applications. The plurality of applications may be controlled or executed by a plurality of master devices. In addition, the plurality of applications may be controlled or executed by one master device. The master device may be a device that requests data from another device. Further, the master device may be a device that receives and processes (or handles) the requested data. For example, the master device may be a Central Processing Unit (CPU), a Graphic Processing Unit (GPU), an Image Signal Processor (ISP), a Direct Memory Access (DMA), a Digital Signal Processor (DSP), or the like. The master device may be referred to as a control device.

The master device may request data from a slave device for the control or execution of the applications. The request for the data may include one or more of a read request and a write request. The request for the data may be referred to as a data request for convenience of explanation. The slave device may be a device that stores data and/or commands received from other components (e.g., a master device or control device) of the electronic device or generated by other components. For example, the slave device may be a volatile storage device, a nonvolatile storage device, or a controller that controls a memory device. The slave device may be referred to as a storage device.

Each of the applications may be implemented according to various scenarios. Further, each of the various scenarios may have different data throughputs. The master devices may generate various data requests on the basis of different data throughputs.

An electronic device according to various embodiments may control various data requests generated as described above. In addition, an electronic device and an operation method thereof according to various embodiments may improve the performance of the electronic device 100 through the control of data requests.

Figure 2:
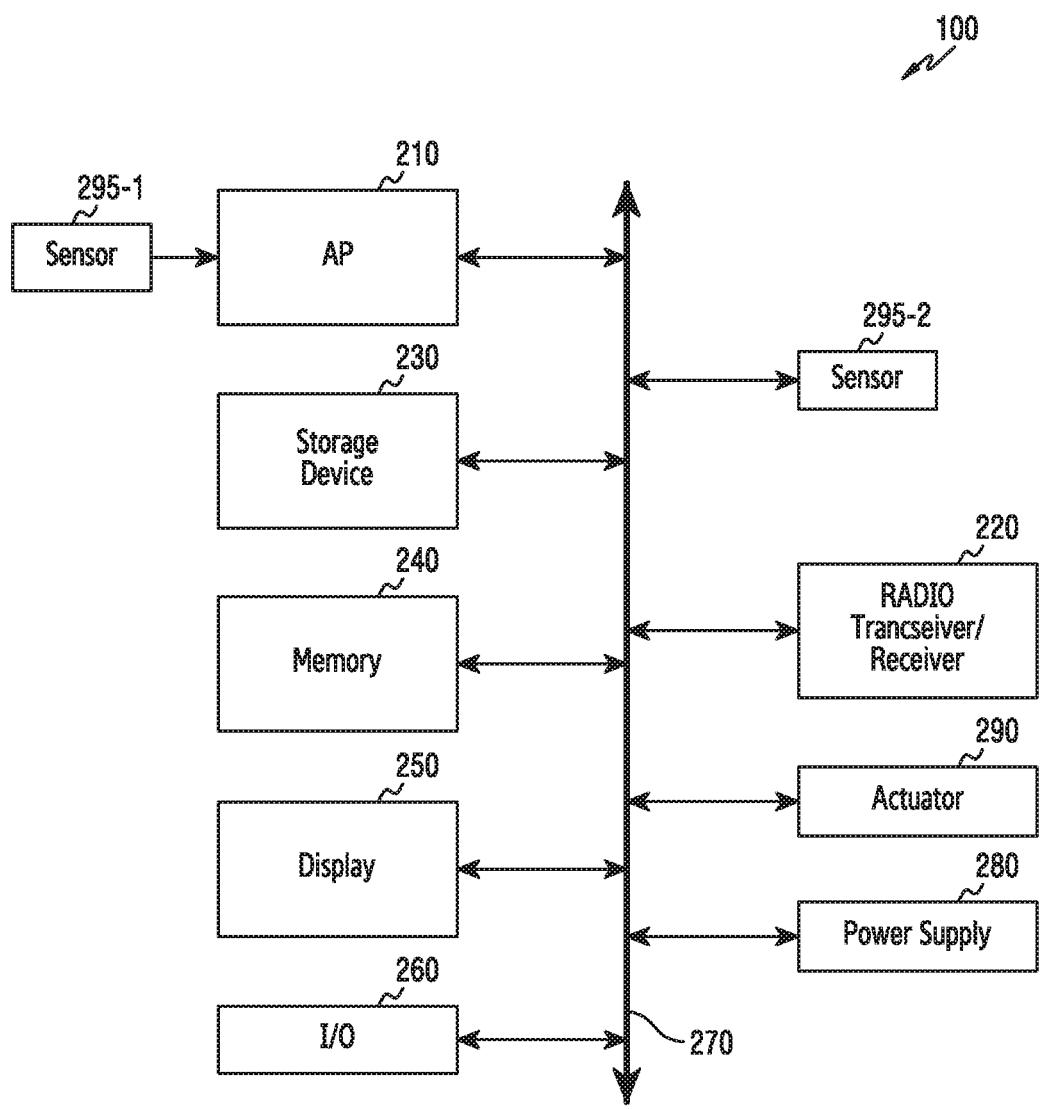
FIG. 2 illustrates a functional block configuration for an electronic device capable of performing various functions according to various embodiments.

FIG. 2 illustrates a functional block configuration for an electronic device capable of performing various functions according to various embodiments. The functional block configuration may be included in the electronic device 100 illustrated in FIG. 1.

The electronic device 100 illustrated in FIG. 2 may be any mobile system, such as a mobile phone, a smartphone, a music player, a portable game console, a navigation system, or a laptop computer.

Referring to FIG. 2, the electronic device 100 may include an Application Processor (AP) 210, a communication interface 220, a storage device 230, a memory 240, a display 250, an input/output device 260, a data bus 270, a power supply device 280, an actuator 290 and/or at least one sensor 295-1 or 295-2.

The AP 210 may control the overall operation of the electronic device 100. The AP 210 may execute applications that provide an Internet browser, a game, a video, and the like. According to an embodiment, the AP 210 may include a single processor core or multiple processor cores. For example, the application processor 210 may include a multi-core, such as a dual-core, a quad-core, or a hexa-core. According to an embodiment, the AP 210 may further include a cache memory disposed internally or externally.

The communication interface 220 may establish communication between the electronic device 100 and an external device. For example, for the execution or control of an application, the communication interface 220 may be connected to a network via wireless communication or wired communication to communicate with the external device. The communication interface 220 may include a transmitter and/or a receiver.

The storage device 230 may store a boot image to boot the electronic device 100. For example, the storage device 230 may include a nonvolatile memory device, such as a flash memory device or a Solid State Drive (SSD).

The storage device 230 may receive a data request from the AP 210. The storage device 230 may provide data to the AP 210 in response to the reception of the data request.

The memory 240 may store data necessary for the operation of the electronic device 100. For example, the memory 240 may include a volatile memory device, such as Dynamic Random Access Memory (DRAM) or Static Random Access Memory (SRAM).

The memory 240 may receive a data request from the AP 210. The memory 240 may provide data to the AP 210 in response to the data request.

The display 250 may display the result of processing in the electronic device 100. For example, the display 250 may provide a user with an execution screen of an application executed on the electronic device 100. The display 250 may be a Liquid Crystal Display (LCD) or an Organic Light Emitting Diode (OLED) display.

The input/output device 260 may include an input tool, such as a touch pad, a keypad, or an input button, and an output tool, such as a display or a speaker. For example, the input/output device 260 may provide the electronic device 100 with a user input related to a scenario of the application, and may provide the user with an output related to the scenario of the application.

The data bus 270 may connect the components 210 to 295-2 of the electronic device 100 to each other. The data bus 270 may include a circuit to deliver communications (e.g., control messages and/or data) between the components.

The power supply device 280 may supply an operating voltage necessary for the operation of the electronic device 100. The power supply device 280 may include a power supplier and/or a battery.

The actuator 290 may include various components necessary to physically drive the electronic device 100. For example, the actuator 290 may include a motor drive circuit and a motor. The actuator 290 may physically drive the electronic device 100 according to the execution of the application.

The sensor 295-1 may be, for example, an image sensor that senses an image. The sensor 295-1 may be connected to the AP 210 and may transmit generated image information to the AP 210.

The sensor 295-2 may be a biosensor that senses biometric information. For example, the sensor 295-2 may sense a fingerprint, an iris pattern, a blood vessel pattern, a heart rate, a blood glucose level, and the like, may generate sensing data corresponding to sensed information, and may provide the sensing data to the electronic device 100. The sensor 295-2 may not be limited to a biosensor. For example, the sensor 295-2 may be any sensor, such as an illumination sensor, an acoustic sensor, or an acceleration sensor.

The electronic device 100 may execute various applications through one or more of the sensor 295-1 and the sensor 295-2. The AP 210 may generate various data requests according to the execution of various applications.

One or more of the AP 210, the communication interface 220, the storage device 230, the memory 240, the display 250, the input/output device 260, the data bus 270, the power supply device 280, the actuator 290, the sensor 295-1, and the sensor 295-2 may be configured in the form of a System on Chip (SoC).

Figure 3:
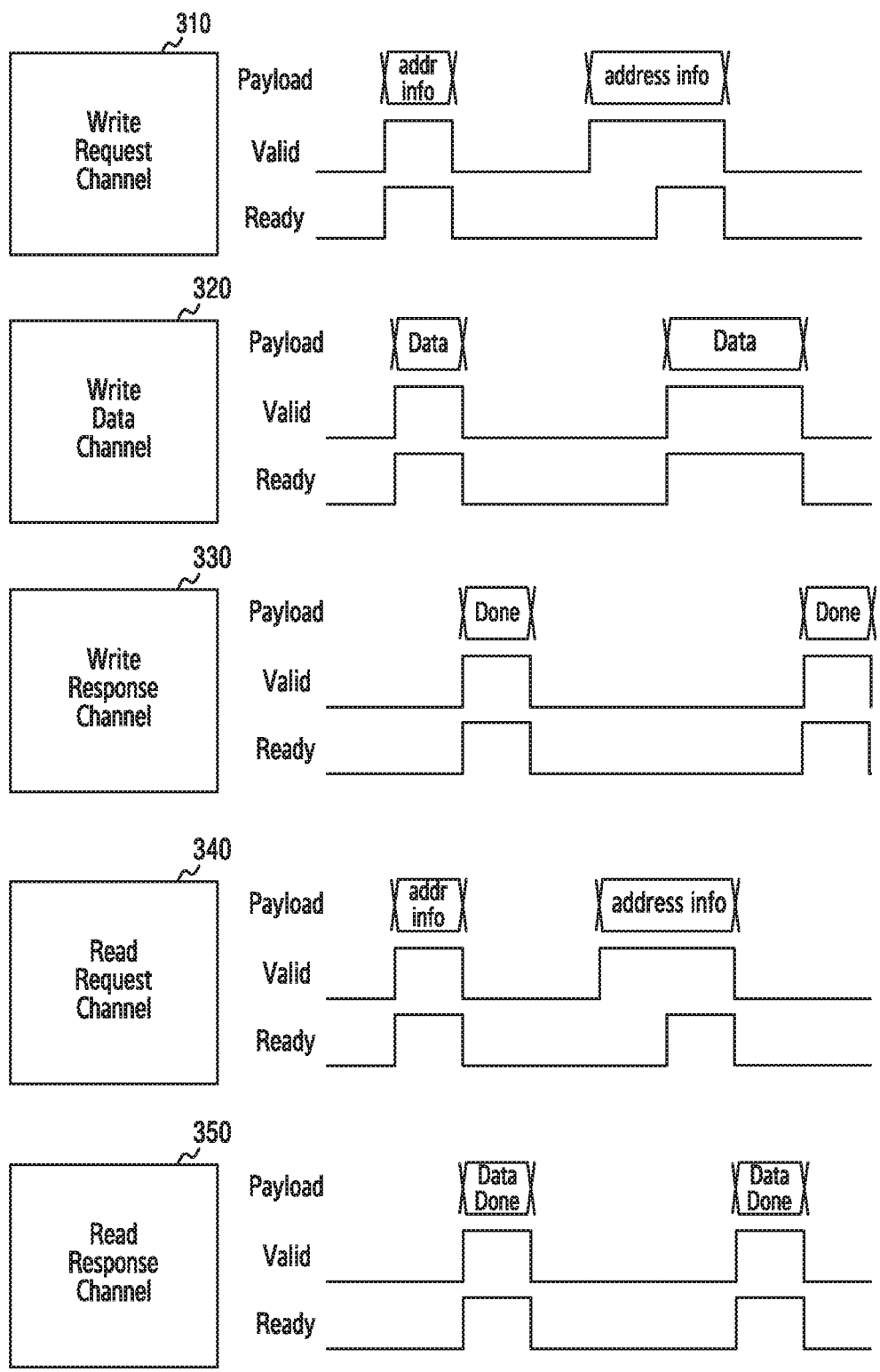
FIG. 3 illustrates examples of channels associated with data request and transmission according to various embodiments.

FIG. 3 illustrates examples of channels associated with data request and transmission according to various embodiments. Such examples of channels may be used for data request and transmission between components (e.g., a master device, a slave device, and the like) included in the electronic device 100 illustrated in FIG. 1.

The examples illustrated in FIG. 3 may be a channel example according to the Advanced Extensible Interface (AXI) protocol of the Advanced Microcontroller Bus Architecture (AMBA). The channels illustrated in FIG. 3 are only for illustration, and other protocols may be used according to various embodiments. For example, the electronic device of the present disclosure may request and transmit data in accordance with the ACE Coherency Extensions (ACE) protocol, the Advanced High-performance Bus (AHB), the Open Core Protocol (OCP), or a custom interface protocol.

Referring to FIG. 3, the channels according to various embodiments may include a write request channel 310, a write data channel 320, a write response channel 330, a read request channel 340, and a read response channel 350.

The write request channel 310 may function to carry an address of data to be processed and control information via a signal. For example, in the write request channel 310, a payload may include information on an address of data to be written or updated by the control device (or master device). A payload is a term to indicate a portion of a transmission object, which may be used to mean data excluding a header and meta data transmitted along the data. In the write request channel 310, the control device may transmit the address of the data to be processed to the storage device (or slave device) through a valid signal. When a ready signal is generated in response to the valid signal, the controller may determine that the address of the data to be processed has been completely transmitted.

The write data channel 320 may function to carry data to be stored in the storage device. For example, in the write data channel 320, a payload may include data to be stored in the storage device. In the write data channel 320, the control device may transmit the data to be stored to the storage device via a valid signal. When a ready signal is generated in response to the valid signal, the control device may determine that the data to be stored has been transmitted to the storage device.

Data of the write response channel 330 may be generated from the storage device and may be transmitted to the control device. The data of the write response channel 330 may include information on whether a write operation is properly completed. For example, in the write response channel 330, a payload may include a message indicating that a write operation is completed. In the write response channel 330, the storage device may transmit a message indicating that writing is normally completed to the control device through a valid signal. When a ready signal is generated in response to the valid signal, the storage device may determine that the message indicating that writing is completed has been transmitted to the control device.

The read request channel 340 may carry an address of data to be read and control information. For example, in the read request channel 340, a payload may include information on an address of data to be read by that the control device. In the read request channel 340, the control device may transmit the address of the data to be read to the storage device via a valid signal. When a ready signal is generated in response to the valid signal, the control device may determine that the address of the data to be read has been completely transmitted.

The read response channel 350 may carry information on whether a read request operation is normally completed and data corresponding to a read request. For example, in the read response channel 350, a payload may include the data corresponding to the read request (that is, data stored in the storage device). In the read response channel 350, the storage device may transmit information on whether the read request operation is normally completed and the data corresponding to the read request to the control device through a valid signal. When a ready signal is generated in response to the valid signal, the storage device may determine that the information on whether the read request operation is normally completed and the data corresponding to the read request have been completely transmitted.

According to various embodiments, since the control device transmits a data request (e.g., a read request, a write request, or the like) via various components of the electronic device 100, a few cycles to several hundreds of cycles may be taken to transmit the data request. In order to solve such a disadvantage, the control device according to various embodiments may be designed to be capable of making a plurality of data requests within a limited range regardless of a response to a data request.

Figure 4:
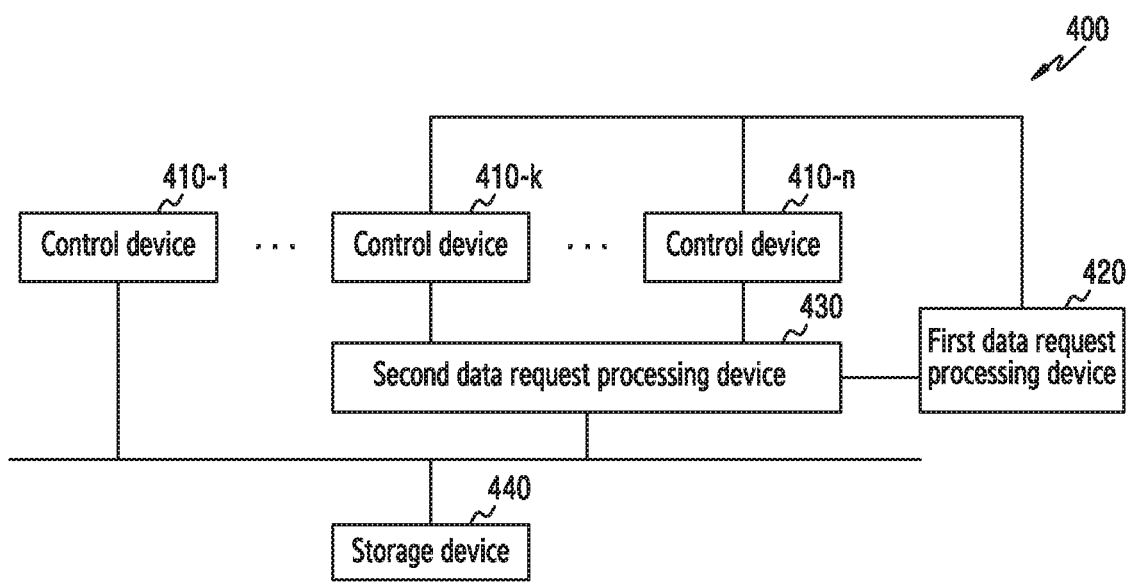
FIG. 4 illustrates a functional block configuration for a System on Chip (SoC) according to various embodiments.

FIG. 4 illustrates a functional block configuration for a SoC according to various embodiments.

Referring to FIG. 4, the SoC 400 may include a plurality of control devices 410-1 to 410-n, a first data request processing device 420, a second data request processing device 430, and a storage device 440.

The plurality of control devices 410-1 to 410-n may be devices that request and update data to the storage device 440 for data processing. For example, the plurality of control devices 410-1 to 410-n may be a Central Processing Unit (CPU), a Graphic Processing Unit (GPU), an Image Signal Processor (ISP), a Direct Memory Access (DMA), a Digital Signal Processor (DSP), or the like. The control devices may also be referred to as a master device.

Some or all of the plurality of control devices 410-1 to 410-n may be implemented or controlled by an application. In addition, some or all of the plurality of control devices 410-1 to 410-n may control the operation of the electronic device 100 illustrated in FIG. 1. Some or all of the plurality of control devices 410-1 to 410-n may be implemented in operational combination with the components of the electronic device 100.

Some or all of the plurality of control devices 410-1 to 410-n may receive a command from other components of the electronic device 100 or other components of the SoC 400, may interpret the received command, and may perform calculation or process data according to the interpreted command.

Some or all of the plurality of control devices 410-1 to 410-n may generate a plurality of data requests within a limited range regardless of the response to a data request.

Some or all of the plurality of control devices 410-1 to 410-n may generate information related to states thereof.

Some or all of the plurality of control devices 410-1 to 410-n may include a data processing unit, a state information generation unit, and a data request message generation unit. In addition, some or all of the plurality of control devices 410-1 to 410-n may include a buffer to temporarily store data.

The first data request processing device 420 may generate parameters for the second data request processing device 430 to control a data request.

The first data request processing device 420 may receive state information on some or all of the plurality of control devices 410-1 to 410-n requesting data from the storage device 440. The state information may include one or more of the deadline of a scenario corresponding to the requested data, the processing time of the requested data, information on whether the control device is a preset control device, and storage information on a buffer included in the control device. The first data request processing device 420 may receive the state information every specified period. The specified period may be a period predefined in the SoC 400. The specified period may be changed according to the application execution frequency of the SoC 400.

The first data request processing device 420 may determine a threshold value for an outstanding request allowed for each of the plurality of control devices 410-1 to 410-n requesting data on the basis of the state information. The threshold value may be a value that limits the number of data requests of the control device. The threshold value may indicate the maximum number of data requests that can be queued without any response. For convenience of explanation, the allowed threshold value for the outstanding data request may be referred to as an outstanding data request threshold value.

The control device (e.g., the control device 410-k) may generate a plurality of data requests for the control of an application or the like regardless of a response to a data request. The plurality of data requests may include repeated requests for the same data or may include different data requests, such as a data request a, a data request b, and a data request c. When each of the plurality of control devices generates a plurality of data requests in one period without limitation, the SoC 400 may be overloaded. Further, the control device may not be able to complete a scenario related to the data request at a desired time. Accordingly, the first data request processing device 420 may determine an outstanding data request threshold value to limit the number of data requests of the control device.

The first data request processing device 420 may determine a data request mode for each of the plurality of control devices 410-1 to 410-n requesting data on the basis of the state information.

The first data request processing device 420 may determine the data request priority of the plurality of control devices 410-1 to 410-n requesting data on the basis of the state information.

The first data request processing device 420 may transmit the determined parameters (e.g., the outstanding data request threshold value, the data request mode, the data request priority, or the like) to the second data request processing device 430.

The first data request processing device 420 may include a transceiver to receive state information on the plurality of control devices 410-1 to 410-n and to transmit determined parameters to the second data request processing device 430, a mode determination unit to determine a data request mode, a threshold value determination unit to determine an outstanding data request threshold value, and a priority determination unit to determine a data request priority.

The second data request processing device 430 may control a data request from the plurality of control devices 410-1 to 410-n.

The second data request processing device 430 may receive a data request from the plurality of control devices 410-1 to 410-n. The data request may include a request generated for the execution of an application, for the operation control of an electronic device, or the like.

The second data request processing device 430 may receive information related to a data request from the first data request processing device 420. The information related to the data request may be parameters determined by the first data request processing device 420.

The second data request processing device 430 may calculate the number of outstanding data requests. The number of outstanding data requests may be the number of data requests blocked by the second data request processing device 430 before a current data request. For example, when the second data request processing device 430 blocks a data request from the control device three times, the second data request processing device 430 may calculate the number of outstanding data requests to be 3.

The second data request processing device 430 may determine, on the basis of the information related to the data request, whether to transmit the data request from the control device to the storage device 440.

As illustrated in FIG. 4, the second data request processing device 430 may be connected to the plurality of control devices 410-k to 410-n in a many-to-one manner, or may be connected to one control device (e.g., the control device 410-k) in a one-to-one manner so that a second data request processing device may be present.

The second data request processing device 430 may include an outstanding data request count calculation unit to calculate the number of outstanding data requests and a transmission determination unit to determine whether to transmit a data request.

The storage device 440 may be a device that provides data to the plurality of control devices 410-1 through 410-n. For example, the storage device 440 may be a volatile memory device, a nonvolatile memory device, or a controller to control a memory device. The storage device 440 may also be referred to as a slave device.

Although FIG. 4 illustrates the storage device 440 as a single device, which is for convenience of explanation, the storage device 440 may include a plurality of storage devices if necessary.

The devices illustrated in FIG. 4 have been described as having a SoC structure. According to an embodiment, some or all of the SoC 400 may correspond to some or all of the AP 210, the storage device 230, and the memory 240.

Although FIG. 4 illustrates that the SoC 400 is a System on Chip, if necessary, components of the SoC 400 may be separately combined with components (e.g., the AP 210, the sensor 295-1 or 295-2, or the communication interface 220) of the electronic device 100. That is, the components of SoC 400 according to various embodiments may be separately configured.

Figure 5:
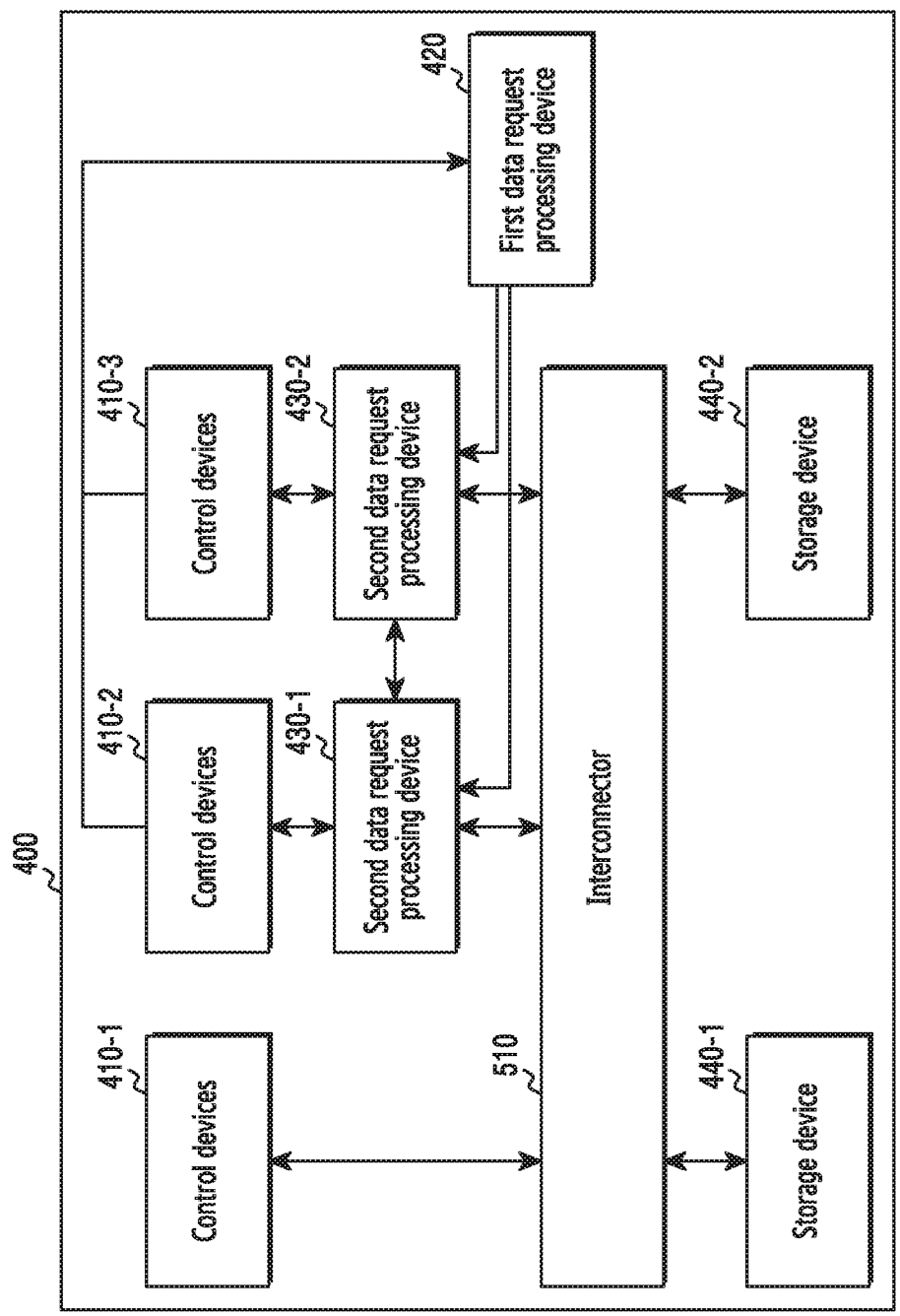
FIG. 5 illustrates a hardware configuration for a SoC according to various embodiments.

FIG. 5 illustrates a hardware configuration for a SoC according to various embodiments. The hardware configuration may be included in the SoC 400 illustrated in FIG. 4.

Referring to FIG. 5, the SoC 400 may include a control device 410-1, a control device 410-2, a control device 410-3, a first data request processing device 420, a second data request processing device 430-1, a second data request processing device 430-2, an interconnector 510, a storage device 440-1, and a storage device 440-2.

For convenience of explanation, it is assumed that: in the SoC 400 according to various embodiments, the control device 410-1 is connected to the interconnector 510, the first data request processing device 420 is connected to the control device 410-2 and the control device 410-3, and to the second data request processing device 430-1 and the second data request processing device 430-2; and the storage device 440-1 and the storage device 440-2 are connected to the interconnector 510.

The control devices 410-1 to 410-3 may be devices that request and update data from a storage device for data processing.

The control device 410-1, the control device 410-2, and the control device 410-3 may generate a plurality of data requests to control an application or to control an electronic device including the SoC 400. The control device 410-1 may transmit the plurality of generated data requests to the interconnector 510 directly connected or operatively coupled to the control device 410-1. The control device 410-2 and the control device 410-3 may transmit the plurality of generated data requests to the second data request processing device (e.g., the second data request processing device 430-1 or 430-2) directly connected or operatively coupled to the control devices.

The control device 410-1, the control device 410-2, and the control device 410-3 may generate state information thereof for the second data request processing device 430-1 or the second data request processing device 430-2 to efficiently control a data request. Some control devices, such as the control device 410-1, may omit generating state information. The control device 410-2 and the control device 410-3 may transmit the generated state information to the first data request processing device directly connected or operatively coupled to the control devices.

The first data request processing unit 420 may receive the state information from each of the control devices, may determine an outstanding data request threshold value for each control device, and may transmit the outstanding data request threshold value to the second data request processing devices 430-1 and 430-2.

Depending on the configuration, the first data request processing device 420 may be included in the control devices or the second data request processing devices 430-1 and 430-2.

The first data request processing device 420 may receive the state information of the control device 410-2 from the control device 410-2 and the state information on the control device 410-3 from the control device 410-3. The first data request processing device 420 may generate (or determine) parameters on the basis of the state information. The parameters may include an outstanding data request count, a data request mode, and a data request priority.

The first data request processing device 420 may transmit the parameters to the second data request processing device 430-1 and the second data request processing device 430-2 directly connected or operatively coupled to the first data request processing device.

The second data request processing device 430-1 and the second data request processing device 430-2 may be disposed between the control devices 410-1, 410-2, and 410-3 and the interconnector 510. The second data request processing device 430-1 and the second data request processing device 430-2 may transmit a data request generated from the control device 410-1, the control device 410-2, and the control device 410-3 to the interconnector 510 or may block the data request to the interconnector 510. FIG. 5 shows that the second data request processing device 430-1 and the second data request processing device 430-2 are connected to the control devices as separate components. According to various embodiments, the second data request processing devices may be included in the control device 410-1, the control device 410-2, and the control device 410-3 or in the interconnector 510 and may be connected to the first data request processing device 420.

The second data request processing device 430-1 and the second data request processing device 430-2 may receive the data request from the control device 410-2 and the control device 410-3. The second data request processing device 430-1 and the second data request processing device 430-2 may receive the parameters from the first data request processing device 420.

The second data request processing device 430-1 and the second data request processing device 430-2 may determine, on the basis of the received parameters, whether to transmit the data request. When the data request is determined to be transmitted, the second data request processing device may transmit the data request to the interconnector 510 directly connected or operatively coupled to the second data request processing device. When the data request is determined to be blocked, the second data request processing device may not transmit but block the data request to the interconnector 510.

The interconnector 510 may divide storage devices (e.g., the storage device 440-1 and the storage device 440-2) for processing the data request from the control devices and may transmit the data request to the storage devices. In addition, the interconnector 510 may transmit data provided by the storage devices to a related control device. The data request may include reading data stored in the storage device and writing data in the storage device. Further, the interconnector 510 may transmit information indicating that stored data is completely provided or updated in response to the data request from the storage device to the control device.

The interconnector 510 may receive a data request from the control device 410-1. The interconnector 510 may receive a data request from the second data request processing device 430-1 or the second data request processing device 430-2.

The interconnector 510 may transmit a received data request to the storage device 440-1 or the storage device 440-2 directly connected or operatively coupled to the interconnector 510.

The storage device 440-1 and the storage device 440-2 may receive a data request from the interconnector 510. Upon receiving the data request, the storage device 440-1 and/or the storage device 440-2 may provide data corresponding to the data request to the control device 410-1, the control device 410-2, and/or the control device 410-3 that are directly connected to or operatively coupled to the storage device 440-1 and/or the storage device 440-2.

Figure 6:
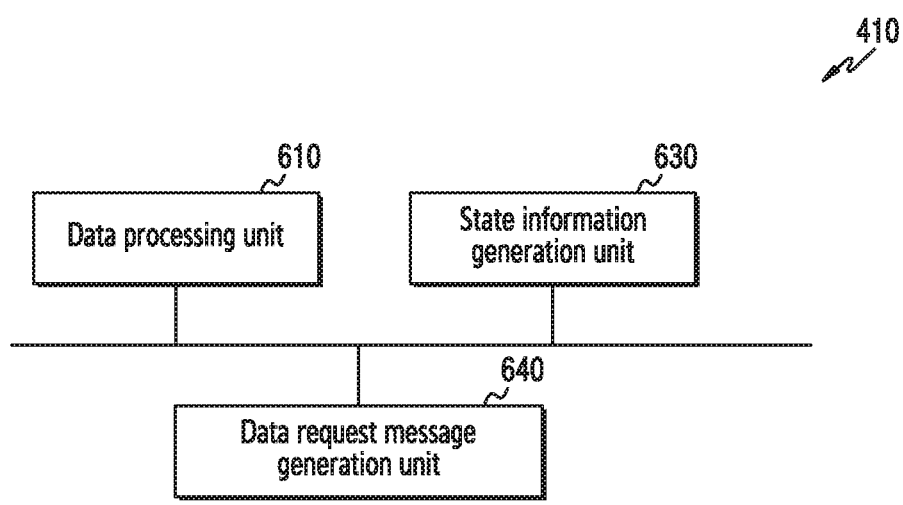
FIG. 6 illustrates a functional block configuration for a control device according to various embodiments.

FIG. 6 illustrates a functional block configuration for a control device according to various embodiments. The block configuration may be included in one or more (hereinafter, referred to as a control device 410) of the control device 410-1, the control device 410-2, and the control device 410-3 illustrated in FIG. 4.

Referring to FIG. 6, the control device 410 may include a data processing unit 610, a transceiver 620, a state information generation unit 630, and a data request message generation unit 640.

The data processing unit 610 may process data received by the control device 410 or data generated by the control device 410. The data processing unit 610 may process the data according to various scenarios. The time taken to completely process the data may vary depending on the scenarios. In addition, the time taken to completely process the data may vary depending on the environment of the control device 410 or the frequency of the control device 410 even in the same scenario.

The state information generation unit 630 may generate state information on the control device 410. The state information may include the deadline of a scenario corresponding to a data request, data processing time, configuration information on the control device 410, and storage information on a buffer (not shown in FIG. 6) included in the control device 410. The deadline of the scenario corresponding to the data request may indicate the deadline or end time of a scenario on which a generated data request is based. The data processing time may indicate the time taken for the data processing unit 610 to process requested data. The configuration information on the control device 410 may include a specific setting and a general setting. The specific setting may be a setting for processing a data request according to a predefined rule. The specific setting may include a bypath setting and a masked setting. The general setting may be a setting for processing a data request on the basis of the deadline of a scenario corresponding to the data request and data processing time. The general setting may include a normal setting and a block setting.

The data request message generation unit 640 may generate a data request message to control an application or an electronic device. The data request message may include information on necessary data and information on a destination of the data request message (e.g., information on the storage device 440-1, the interconnector 510, or the second data request processing device 430-1 illustrated in FIG. 4).

The data processing unit 610, the state information generation unit 630, and the data request message generation unit 640 may be collectively referred to as a controller.

Although not shown in FIG. 6, the control device 410 may include a transceiver. The transceiver may transmit a signal to other components (e.g., the components of the SoC 400 illustrated in FIG. 4 or the components of the electronic device 100 illustrated in FIG. 2). For example, the transceiver may transmit a signal from the first data request processing device 420 to the second data request processing device. Also, the transceiver may transmit a signal from the first data request processing device 420 to other components of an electronic device 100. The transceiver may receive a signal from other components. For example, the transceiver may receive state information of a control device from the control device. The transceiver may be configured as a bus.

Figure 7:
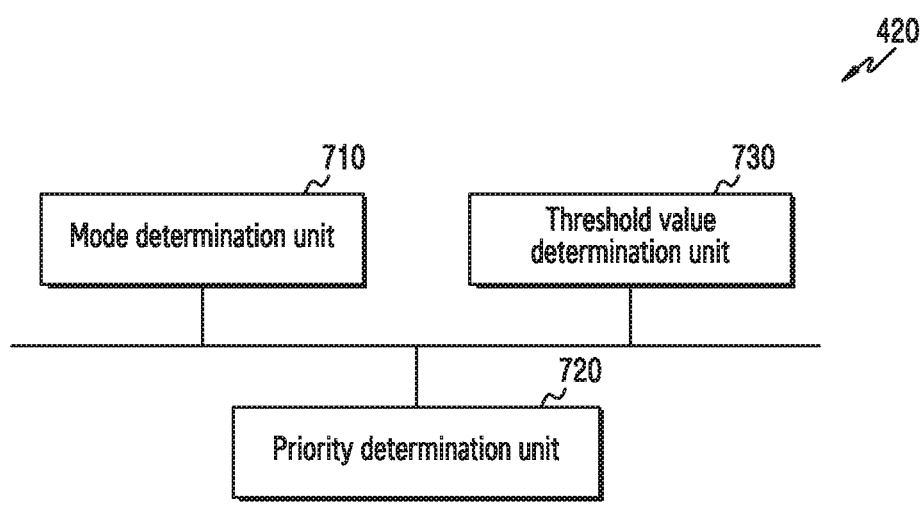
FIG. 7 illustrates a functional block configuration for a first data request processing device according to various embodiments.

FIG. 7 illustrates a functional block configuration for a first data request processing device according to various embodiments. The block configuration may be included in the first data request processing device 420 illustrated in FIG. 4.

Referring to FIG. 7, the first data request processing device 420 may include a mode determination unit 710, a priority determination unit 720, and a threshold value determination unit 730.

The mode determination unit 710 may determine a data request mode for control devices requesting data on the basis of state information on the control devices. For example, when the control device is a control device having a specific setting, the first data request processing device 420 may determine the data request mode of the control device to be a specific mode.

The mode determination unit 710 may further classify the specific mode into a bypass mode and a masked mode and may determine a data request mode. The bypass mode may be a data request mode having the highest outstanding data request threshold value or a data request mode having the top data request priority. The masked mode may be a data request mode having the lowest outstanding data request threshold value or a data request mode having the last data request priority.

When the control device is a control device having a general setting, the first data request processing device 420 may determine the data request mode of the control device to be a general mode.

The mode determination unit 710 may further classify the general mode into a normal mode and a blocked mode and may determine a data request mode. The classification of the mode may be performed according to the relationship between the time required for data processing and the time at which processing needs to be completed according to a scenario. For example, when the difference between the time at which data processing needs to be completed and the time at which data processing is completed is smaller than a reference value (or a threshold value), the mode determination unit 710 may determine the data request mode to be the normal mode. The time at which data processing is completed may be a value determined when the control device can continue to processing the data. When the difference between the time at which data processing needs to be completed and the time at which data processing is completed is equal to or greater than the reference value, the mode determination unit 710 may determine the data request mode to be the blocked mode. When a data request is made in the blocked mode, a low-level data request may be allowed, and accordingly processing of data corresponding to the data request in the blocked mode may be delayed. When the difference between the time required for data processing and the time allowed for data processing according to the scenario is smaller than the reference value due to the continuously delayed data request in the blocked mode, the mode determination unit 710 may change the data request mode from the blocked mode to the normal mode.

Information on the data request mode determined by the mode determination unit 710 may be provided to one or more of the priority determination unit or the threshold value determination unit 730.

According to an embodiment, the first data request processing device 420 may not perform an operation of determining a data request mode. In this case, the mode determination unit 710 may be omitted from the configuration of the first data request processing device 420.

The priority determination unit 720 may prioritize data requests on the basis of one or more of the state information on the control devices or data request mode information provided from the mode determination unit. For example, when the first data request processing device receives five data requests, the priority determination unit 720 may determine data request priorities for the five data requests.

The priority determination unit 720 may assign priority according to the determined data request mode. For example, when the first data request processing device 420 receives a data request determined to be in the bypass mode, a data request determined to be in the masked mode, a data request determined to be in the normal mode, and a data request determined to be in the blocked mode, the priority determination unit 720 may determine data request priorities in order of the data request determined to be in the bypass mode, which is the top priority, the data request determined to be in the normal mode, the data request determined to be in the blocked mode, and the data request determined to be in the masked mode.

In another embodiment, the priority determination unit 720 may separate some data request modes among all data request modes, and may assign priority only to the remaining data request modes. For example, the priority determination unit 720 does not assign priority to the data request determined to be in the bypass mode and the data request determined to be in the masked mode among all the data request modes, and may assign priority only to the data request determined to be in the normal mode and the data request determined to be in the blocked mode.

The priority determination unit 720 may prioritize data requests on the basis of the deadline of a scenario corresponding to the data requests. For example, when there are a control device (hereinafter, a first control device) that requests data when a scenario deadline is imminent and a control device (hereinafter, a second control device) that requests data when there is sufficient time left before the deadline of a scenario, the first data request processing device 420 may determine a relatively high priority for the data request from the first control device and may determine a relatively low priority for the data request from the second control device.

The priority determination unit 720 may prioritize data requests on the basis of the processing time (or handling time) of requested data. For example, when the time taken for the control device 410 illustrated in FIG. 4 to process requested data exceeds a reference time (or threshold time), the priority determination unit 720 may determine a relatively high priority for the data request. However, when the time taken for the control device 410 to process the requested data does not exceed the reference time (or threshold time), the priority determination unit 720 may determine a relatively low priority for the data request.

The priority determination unit 720 may prioritize data requests on the basis of a combination of the prioritization methods described above. For example, the priority determination unit 720 may prioritize data requests in the normal mode on the basis of the deadline of a scenario corresponding to each of the data requests in the normal mode. In another example, the priority determination unit 720 may prioritize data requests in the normal mode in consideration of the processing time of requested data and the deadline of a scenario corresponding to the data requests.

The priority determination unit 720 may update the determined data request priorities. For example, suppose that a first data request is determined to have a priority value of 2, a second data request is determined to have a priority value of 3, a third data request is determined to have a priority value of 1, and a fourth data request is determined to have a priority value of 0. Also, suppose that a delay in processing the first data request causes a scenario operation error and a delay in processing the fourth data request causes performance deterioration. In this case, the priority determination unit 720 may assign a weight of 4 to the priority value of the first data request, thereby updating the priority value of the first data request to 6. Further, the priority determination unit 720 may assign a weight of 2 to the priority value of the fourth data request, thereby updating the priority value of the fourth data request to 2. The weight value assigned according to the priority may be defined according to the ongoing scenario and the progress of the scenario. The weight value may be defined according to the type of data request and the device that generates the data request.

Information on the data request priorities determined by the priority determination unit 720 may be provided to the threshold value determination unit 730.

According to an embodiment, the first data request processing device 420 may not prioritize received data requests. In this case, the priority determination unit 720 may be omitted from the configuration of the first data request processing device 420.

The threshold value determination unit 730 may determine an outstanding data request threshold value on the basis of one or more of state information on control devices, information on a data request mode, and information on a data request priority.

The threshold value determination unit 730 may determine the outstanding data request threshold value on the basis of the deadline of a scenario corresponding to data requested by a control device. For example, when the deadline of the scenario corresponding to the requested data is imminent, the threshold value determination unit 730 may determine the outstanding data request threshold value to be relatively high considering the deadline. However, when there is sufficient time left before the deadline of the scenario corresponding to the data requested by the control device, the threshold value determination unit 730 may determine the outstanding data request threshold value to be relatively low considering the deadline.

The threshold value determination unit 730 may determine the outstanding data request threshold value on the basis of the processing time of the data requested by the control device. For example, when the control device needs to process the requested data for a long time, the threshold value determination unit 730 may determine the outstanding data request threshold value to be relatively high considering the long processing time. However, when the control device can process the requested data for a short time, the threshold value determination unit 730 may determine the outstanding data request threshold value to be relatively low considering the short processing time.

The threshold value determination unit 730 may determine the outstanding data request threshold value based on storage information on a buffer included in the control device. For example, when the storage capacity of the buffer reaches a storage limit, the threshold value determination unit 730 may determine the outstanding data request threshold value to be relatively high considering this storage capacity. However, when the buffer has spare storage capacity, the threshold value determination unit 730 may determine the outstanding data request threshold value to be relatively low considering this storage capacity.

The threshold value determination unit 730 may determine the outstanding data request threshold value based on the data request mode. For example, when the data request mode is the bypass mode, the threshold value determination unit 730 may determine the outstanding data request threshold value such that the requested data can be processed as quickly as possible (i.e., the outstanding data request threshold value can be determined to be relatively very high). However, when the data request mode is the masked mode, the threshold value determination unit 730 may determine the outstanding data request threshold value such that other data requests have sufficient transmission opportunities (i.e., the outstanding data request threshold value can be determined to be relatively very low).

The threshold value determination unit 730 may determine the outstanding data request threshold value based on the data request priority. For example, when the data request priority is relatively high, the threshold value determination unit 730 may determine the outstanding data request threshold value to be relatively high in view of the high data request priority. However, when the data request priority is relatively low, the threshold value determination unit 730 may determine the outstanding data request threshold value to be relatively low in view of the low data request priority.

The threshold value determination unit 730 may determine the outstanding data request threshold value based on a combination of the aforementioned methods for determining the outstanding data request threshold value. For example, the threshold value determination unit 730 may determine the outstanding data request threshold value based on the deadline of the scenario corresponding to the data request and the data processing time. In another example, the threshold value determination unit 730 may determine the outstanding data request threshold value based on the storage information on the buffer, the data request mode, and the data request priority.

The threshold value determination unit 730 may determine the outstanding data request threshold value according to the data request priority. For example, the threshold value determination unit 730 may determine the outstanding data request threshold value using Table 1 below.

TABLE 1

| Maximum priority | Normal mode | Blocked mode | Masked mode |
|---|---|---|---|
| 7 | Priority value equal to maximum priorty -> Index = 3 Other priority values -> Index = 0 | Index = null | Index = 0 |
| 6 |  |  |  |
| 5 |  |  |  |
| 4 |  |  |  |
| 3 | Index = priority value | Index = 0 |  |
| 2 |  |  |  |
| 1 |  | Index = 3 |  |
| 0 |  |  |  |

In Table 1, the priority may indicate a priority value determined or updated by the priority determination unit 720. In addition, the maximum priority may indicate the highest priority value among one or more data request priority values, and the normal mode, the blocked mode, and the masked mode may indicate a data request mode. The index may be a value indicating the outstanding data request threshold value or a value corresponding to the outstanding data request threshold value. For example, suppose that the priority value (determined or updated) of a first data request is 7, the priority value of a second data request is 3, the priority value of a third data request is 1, and the priority value of a fourth data request is 0. In this case, an outstanding data request threshold value for the first data request may be determined to be 3. An outstanding data request threshold value for the second data request may be determined to be 0 when the second data request is in the normal mode; to be null when in the blocked mode; and to be 0 when in the masked mode. Likewise, an outstanding data request threshold value for the third data request may be determined to be 0 when the third data request is in the normal mode; to be null when in the blocked mode; and to be 0 when in the masked mode. Likewise, an outstanding data request threshold value for the fourth data request may be determined to be 0 when the fourth data request is in the normal mode; to be null when in the blocked mode; and to be 0 when in the masked mode.

In another example, suppose that the priority value of a first data request is 1, the priority value of a second data request is 3, and the priority value of a third data request is 0. In this case, an outstanding data request threshold value for the first data request may be determined to be 1, which is the priority value thereof when the first data request is in the normal mode; to be 0 when the first data request is in the blocked mode; and to be 0 when the first data request is in the masked mode. Likewise, an outstanding data request threshold value for the second data request may be determined to be 3 which is the priority value thereof. Likewise, an outstanding data request threshold value for the third data request may be determined to be 0, which is the priority value thereof, when the third data request is in the normal mode; to be 0 when the third data request is in the blocked mode; and to be 0 if the data request is in the masked mode.

In still another example, suppose that the priority value of a first data request is 1, the priority value of a second data request is 0, the priority value of a third data request is 0, and all these data requests are in the normal mode. All of an outstanding data request threshold value for the first data request, an outstanding data request threshold value for the second data request, and an outstanding data request threshold value for the third data request may be determined to be 3.

Table 1 may also be referred to as a request count table.

In another embodiment, the request count table (or Table 1) may be included in a second data request processing device. In this case, an operation of obtaining the outstanding data request threshold value using the request count table may be performed by the second data request processing device.

Figure 8:
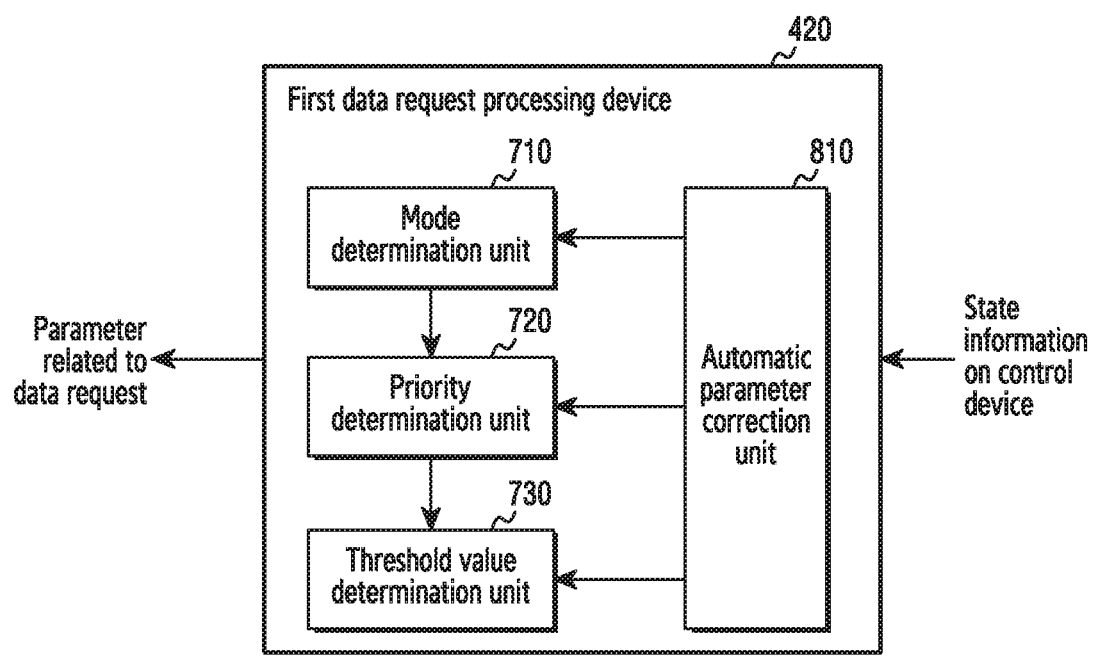
FIG. 8 illustrates a hardware configuration for a first data request processing device according to various embodiments.

FIG. 8 illustrates a hardware configuration for a first data request processing device according to various embodiments. The hardware configuration may be included in the first data request processing device 420 illustrated in FIG. 4.

Referring to FIG. 8, the first data request processing device 420 may include a mode determination unit 710, a priority determination unit 720, a threshold value determination unit 730, and an automatic parameter correction unit 810.

The first data request processing device 420 may receive state information on control devices in real time. The state information may include information on the valid data amount of the control devices (i.e., storage information on a buffer in other words), information on whether the control devices operate, the deadline of a scenario corresponding to a data request from the control devices, the processing time of requested data, and the like.

The mode determination unit 710 may determine the data request mode of each control device to be one of the four modes, and may transmit the corresponding information to the priority determination unit 720. As described above, according to an embodiment, the mode determination unit 710 may be omitted from the configuration of the first data request processing device 420.

The priority determination unit 720 may prioritize data requests on the basis of one or more of the determined data request mode or the state information on the control devices. As described above, according to an embodiment, the priority determination unit 720 may be omitted from the configuration of the first data request processing device 420.

The threshold value determination unit 730 may determine an outstanding data request threshold value on the basis of one or more of the determined data request priority value, the determined data request mode, and the state information on the control devices. When the determined data request priority value, the determined data request mode, and the state information on the control devices are all received, the threshold value determination unit 730 may generate an outstanding data request threshold value using a table, such as Table 1, and may limit the number of data requests.

The performance of a scenario or the performance of an electronic device may be determined on the basis of a control device that takes the longest processing time. To preferentially process a control device that consumes the longest processing time, the first data request processing device 420 may compare information on whether each control device operates and time required for scenario-based data processing and may detect a control device having the greatest difference therebetween. The first data request processing device 420 may delay processing of the detected control device and may speed up processing of the other control devices, thereby improving the overall scenario performance.

The automatic parameter correction unit 810 may adjust information initially set for each control device (e.g., an outstanding data request threshold value used for a data request in the normal mode, a table value including Table 1, or the like) to a minimum unit, thereby improving scenario performance. Methods used for automatic parameter correction may include a method of comparing information on whether each control device operates and time required for scenario-based data processing and reducing an outstanding data request threshold value for control devices having a significant difference therebetween, a method of reducing the number of outstanding data requests calculated by the second data request processing device 430 illustrated in FIG. 4, and the like. These methods used for automatic parameter correction are present merely for illustration, and various methods may be used for automatic parameter correction.

FIGS. 9A to 9E illustrate an example of updating a data request priority value according to various embodiments. Updating a data request priority value illustrated in FIGS. 9A to 9E may be performed by the priority determination unit 720 illustrated in FIG. 7.

Referring to FIGS. 9A to 9E, the priority determination unit 720 may determine a priority values for a data request in the normal mode to be 0 to 3, and may determine a priority values for data requests in the blocked mode and the masked mode to be 0. The priority value for the data request in the normal mode may be determined on the basis of the ratio between the amount of data stored in a buffer included in each control device and the maximum storage capacity. For example, when the ratio of data stored in a write buffer is equal to or less than ¼ of the maximum storage capacity, the priority value for the data request is determined to be 0. When the ratio of data stored in the buffer is equal to or greater than ¾ of the maximum storage capacity, the priority value for the data request may be determined to be 3. The priority values may be generated in the priority determination unit 720. When data requests have the same priority value but control devices have different data processing speeds per cycle, the priority determination unit 720 may update the priority value to reflect the different processing speeds.

In FIG. 9A, the priority determination unit 720 may determine, on the basis of storage information on the buffer included in each control device, a priority value for a first data request 911 to be 3, a priority value for a second data request 912 to be 2, a priority value for a third data request 913 to be 1, and a priority value for a fourth data request 914 to be 0. The priority determination unit 720 may update the priority value for the first data request 911 into 6 by adding a weight of 3 thereto, may update the priority value for the second data request 912 into 5 by adding a weight of 3 thereto, and may update the priority value for the third data request 913 into 4 by adding a weight of 3 thereto, considering the data processing speed.

In FIG. 9B, the priority determination unit 720 may determine, on the basis of the storage information on the buffer included in each control device, a priority value for a first data request 921 to be 3, a priority value for a second data request 922 to be 2, a priority value for a third data request 923 to be 1, and a priority value for a fourth data request 924 to be 0. The priority determination unit 720 may update the priority value for the first data request 921 into 4 by adding a weight of 1 thereto, may update the priority value for the second data request 922 into 3 by adding a weight of 1 thereto, may update the priority value for the third data request 923 into 2 by adding a weight of 1 thereto, and may update the priority value for the fourth data request 924 into 2 by adding a weight of 1 thereto, considering the data processing speed.

In FIG. 9C, the priority determination unit 720 may determine, on the basis of the storage information on the buffer included in each control device, a priority value for a first data request 931 to be 3, a priority value for a second data request 932 to be 2, a priority value for a third data request 933 to be 1, and a priority value for a fourth data request 934 to be 0. The priority determination unit 720 may update the priority value for the first data request 931 into 7 by adding a weight of 4 thereto, considering the data processing speed.

Figure 9D:
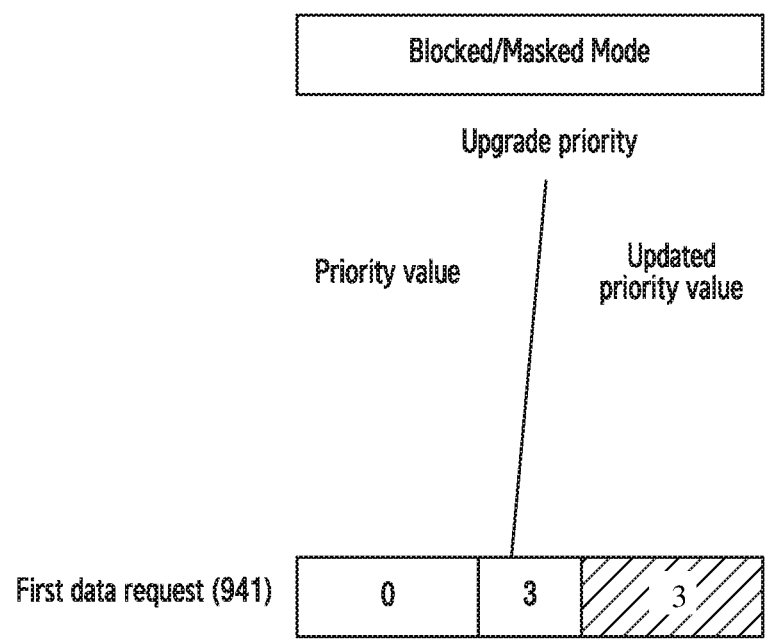

In FIG. 9D, the priority determination unit 720 may determine a priority value for a first data request 941 in the blocked or masked mode to be 0. The priority determination unit 720 may update the priority value for the first data request 941 into 3 by adding a weight of 3 thereto, considering the data processing speed or the upcoming deadline of a scenario corresponding to the data request.

Figure 9E:
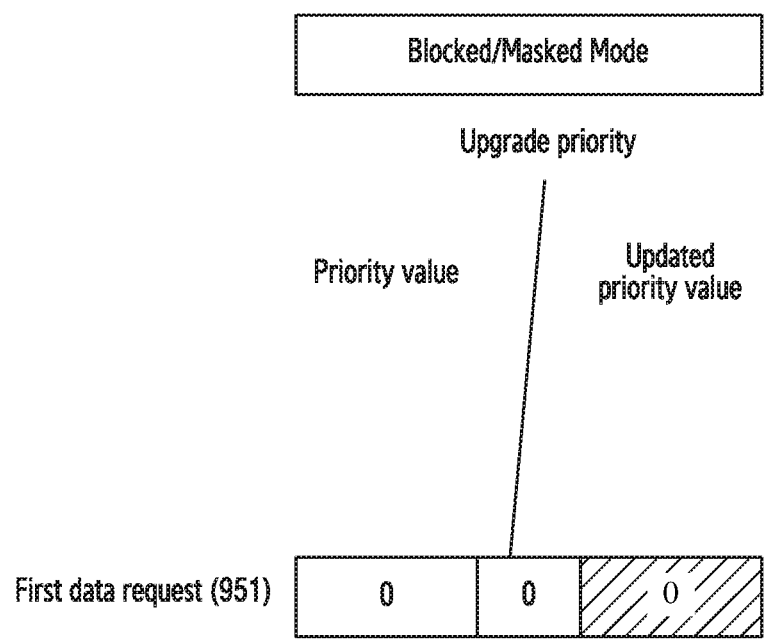

In FIG. 9E, the priority determination unit 720 may determine a priority value for a first data request 951 in the blocked or masked mode to be 0. The priority determination unit 720 may fix the priority value for the first data request 951 in the blocked or masked mode to 0 when there is no change in a scenario implementation environment.

As described above, on the basis of the buffer occupancy rate and a scenario of master devices, data requests may be prioritized, and a weight may be applied. A device according to various embodiments may determine outstanding data request threshold values depending on the priority and the weight. If necessary, these thresholds may be corrected.

Figure 10:
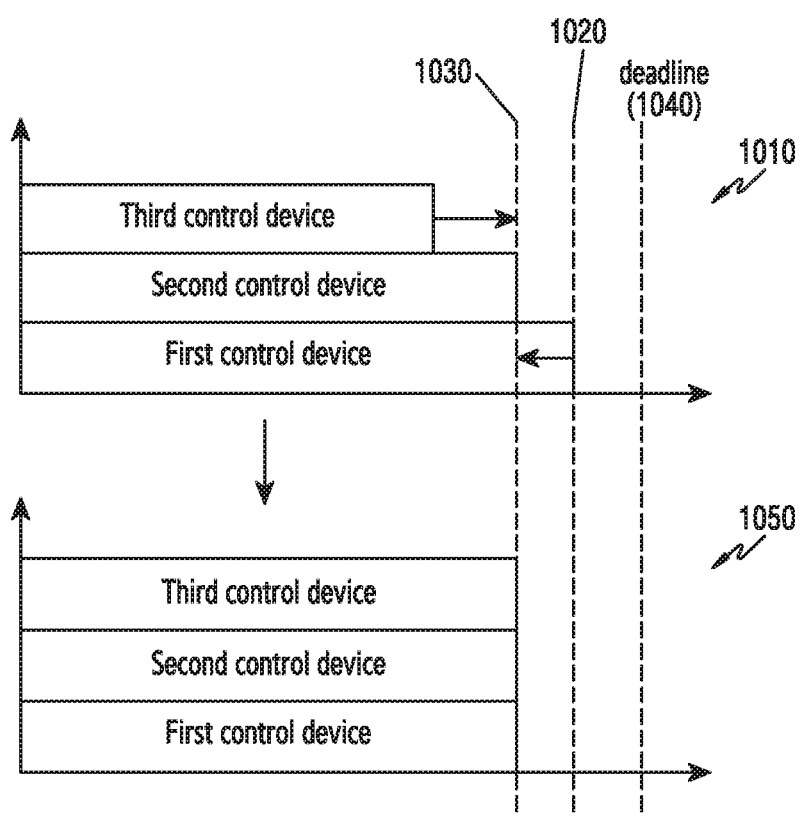
FIG. 10 illustrates an example of automatic parameter correction according to various embodiments.

FIG. 10 illustrates an example of automatic parameter correction according to various embodiments. The example of automatic correction may be performed by the automatic parameter correction unit 810 illustrated in FIG. 8.

Referring to FIG. 10, a state diagram 1010 may be a graph indicating the time taken for each control device to complete a corresponding scenario before parameter correction. The horizontal axis in the state diagram 1010 may be a time axis. The vertical axis in the state diagram 1010 may be an axis for control devices that control different scenarios.

In the state diagram 1010, before the automatic parameter correction unit 810 performs parameter correction, a first control device may complete a first scenario at a deadline 1020, a second control device may complete a second scenario at a deadline 1030, and a third control device may complete a third scenario at a deadline 1040. As described above, the performance of a scenario or the performance of an electronic device may be determined on the basis of a control device that takes the longest processing time. Therefore, the automatic parameter correction unit 810 may perform correction to reduce the deadline of the first scenario. In a tradeoff for reducing the deadline of the first scenario, the deadline of the third scenario may be increased. However, since the performance of a scenario or the performance of an electronic device may be determined on the basis of a control device that takes the longest processing time, such correction may be a correction for improving the performance of the scenarios or the performance of the electronic device.

The automatic parameter correction unit 810 may perform automatic correction by changing the number of outstanding data requests and an outstanding data request threshold value. For example, the automatic parameter correction unit 810 may perform automatic correction by decreasing, by 1, the number of outstanding data requests of the third control device, which completes the scenario first, according to a predetermined rule. On the contrary, the automatic parameter correction unit 810 may perform automatic correction by increasing, by 1, the number of outstanding data requests of the first control device, which completes the scenario last, according to a predetermined rule. Alternatively, the automatic parameter correction unit 810 may perform automatic correction by decreasing, by 1, an outstanding data request threshold value for the third control device according to a predetermined rule or by increasing, by 1, an outstanding data request threshold value for the first control device according to a predetermined rule.

Such automatic correction may be applied to only some of a plurality of control devices connected to a first data request processing device.

A state diagram 1050 may be a graph indicating the time taken for each control device to complete the corresponding scenario after parameter correction is completed. The horizontal axis in the state diagram 1050 may be a time axis. The vertical axis in the state diagram 1050 may be an axis for control devices that control different scenarios.

In the state diagram 1050, the first control device, the second control device, and the third control device may complete the respective scenarios at the deadline 1030 through the foregoing automatic correction.

Figure 11:
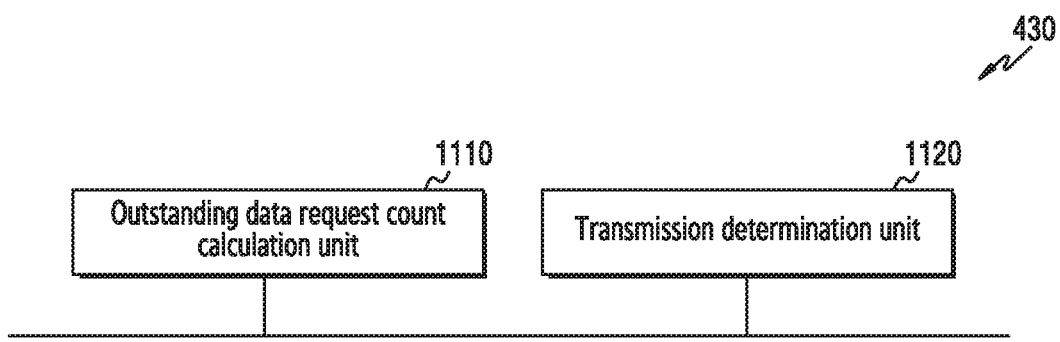
FIG. 11 illustrates a functional block configuration for a second data request processing device according to various embodiments.

FIG. 11 illustrates a functional block configuration for a second data request processing device according to various embodiments. The block configuration may be included in the second data request processing device 430 illustrated in FIG. 4.

Referring to FIG. 11, the second data request processing device 430 may include an outstanding data request count calculation unit 1110 and a transmission determination unit 1120.

The outstanding data request count calculation unit 1110 may calculate the number of outstanding data requests. For example, when a data request from the control device 410-$k$ illustrated in FIG. 4 is delayed m times, the outstanding data request count calculation unit 1110 may calculate the number of outstanding data requests to be m.

The outstanding data request count calculation unit 1110 may update the number of outstanding data requests according to the transmission state of a data request. For example, suppose a data request is delayed four times. In this case, the outstanding data request count calculation unit 1110 may calculate the number of outstanding data requests to be four. Subsequently, when the data request is transmitted twice, the outstanding data request count calculation unit 1010 may subtract the number of data request transmissions of 2 from the first number of outstanding data requests of 4, thereby updating the number of outstanding data requests into 2.

The transmission determination unit 1120 may determine whether to transmit the data request by comparing the number of outstanding data requests with an outstanding data request threshold value.

When the number of outstanding data requests is less than the outstanding data request threshold value, the transmission determination unit 1120 may determine to transmit the data request. For example, when the number of outstanding data requests is 2 and the outstanding data request threshold value is 4, the transmission determination unit 1120 may determine to transmit the data request and may transmit a valid signal to the interconnector 510 illustrated in FIG. 5.

When the number of outstanding data requests is equal to or greater than the outstanding data request threshold value, the transmission determination unit 1120 may block transmission of the data request. For example, when the number of outstanding data requests is 5 and the outstanding data request threshold value is 3, the transmission determination unit 1120 may determine to block the data request.

The outstanding data request count calculation unit 1110 and the transmission determination unit 1120 may be collectively referred to as a controller.

Although not shown in FIG. 11, the second data request processing device 430 may include a transceiver. The transceiver may transmit a signal to other components (e.g., the components of the SoC 400 illustrated in FIG. 4 or the components of the electronic device 100 illustrated in FIG. 2). For example, the transceiver may transmit a signal from the second data request processing device 430 to an interconnector, a storage device, or the like. Also, the transceiver may transmit a signal from the second data request processing device 430 to other components of the electronic device 100. The transceiver may receive a signal from other components. For example, the transceiver may receive data corresponding to a data request from an interconnector or the like. The transceiver may be configured as a bus.

Figure 12:
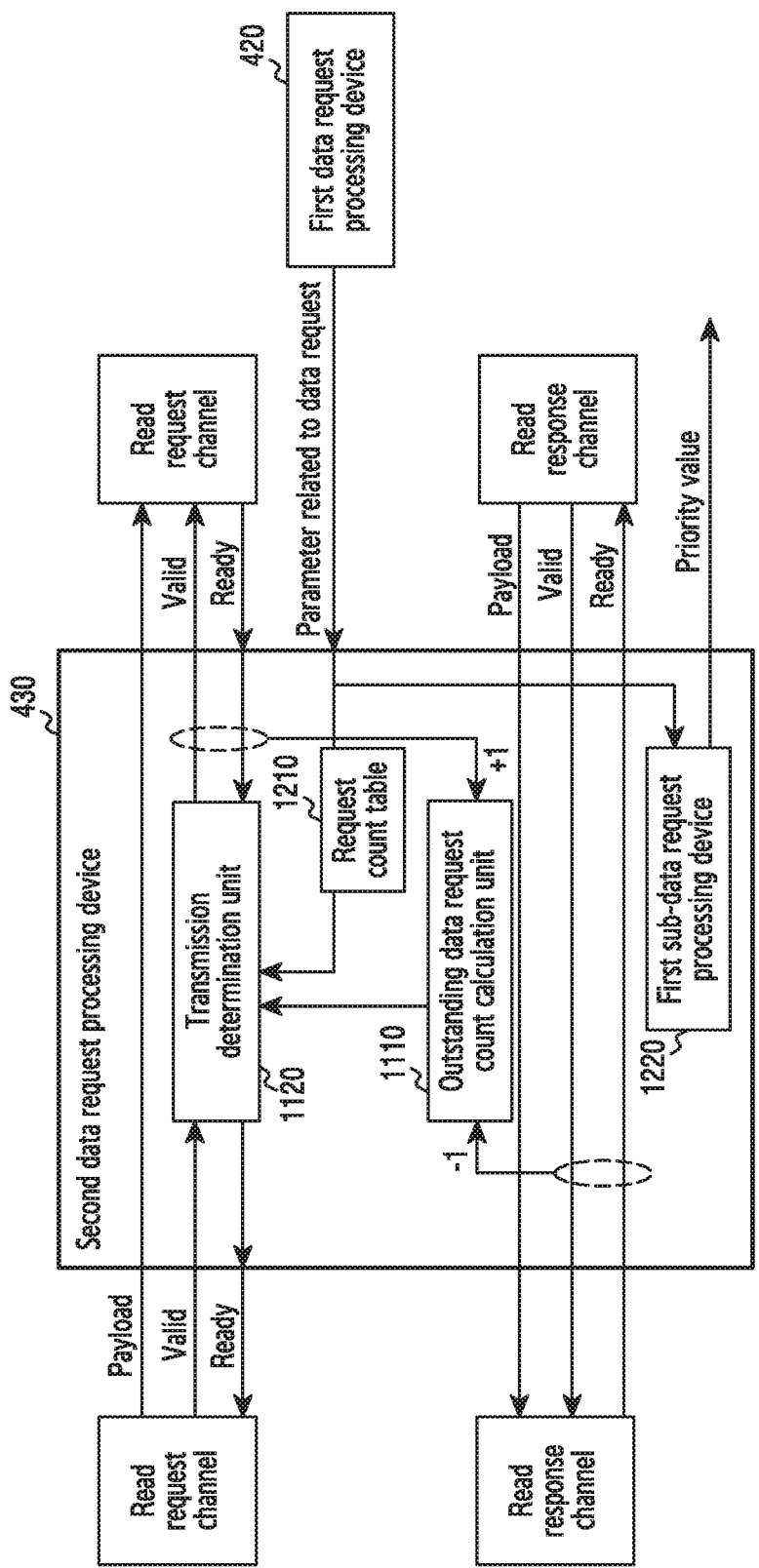
FIG. 12 illustrates a hardware configuration for a second data request processing device according to various embodiments.

FIG. 12 illustrates a hardware configuration for a second data request processing device according to various embodiments. The hardware configuration may be included in the second data request processing device 430 shown in FIG. 4.

Referring to FIG. 12, the second data request processing device 430 may include an outstanding data request count calculation unit 1110, a transmission determination unit 1120, a request count table 1210, and a first sub-data request processing device 1220. The second data request processing device 430 may be directly connected or operatively coupled to the first data request processing device 420 illustrated in FIG. 4.

The second data request processing device 430 may control a data request from control devices. FIG. 12 shows an example of blocking the transmission of a data request from a control device when the calculated number of outstanding data requests reaches an outstanding data request threshold value. Such an example is provided for illustration, and the second data request processing device 430 may control a data request using various control methods in accordance with the AMBA AXI protocol.

The outstanding data request count calculation unit 1110 may calculate the number of outstanding data requests by counting the number of data transmissions via a read or write request channel and the number of data transmissions via a read or write response channel and comparing the difference therebetween. For example, when the number of data transmissions via a read request channel is 3 and the number of data transmissions via a read response channel is 1, the outstanding data request count calculation unit 1110 may calculate the number of outstanding data requests to be 2.

The transmission determination unit 1120 may compare the number of outstanding data requests with the outstanding data request threshold value, and may transmit a valid signal to the interconnector 510 when the outstanding data request threshold value is greater than the number.

In another embodiment, the second data request processing device 430 may count the numbers of data transmissions via read request and write request channel per time, may limit the numbers to be within a specific range, and may control a data request from control devices on the basis of the number of data transmissions via another channel.

The request count table 1210 may be used when the first data request processing device 420 transmits data request priority information other than an outstanding data request threshold value.

The first sub-data request processing device 1220 may be used to control a data request of each interface when one control device has a plurality of interfaces.

Figure 13:
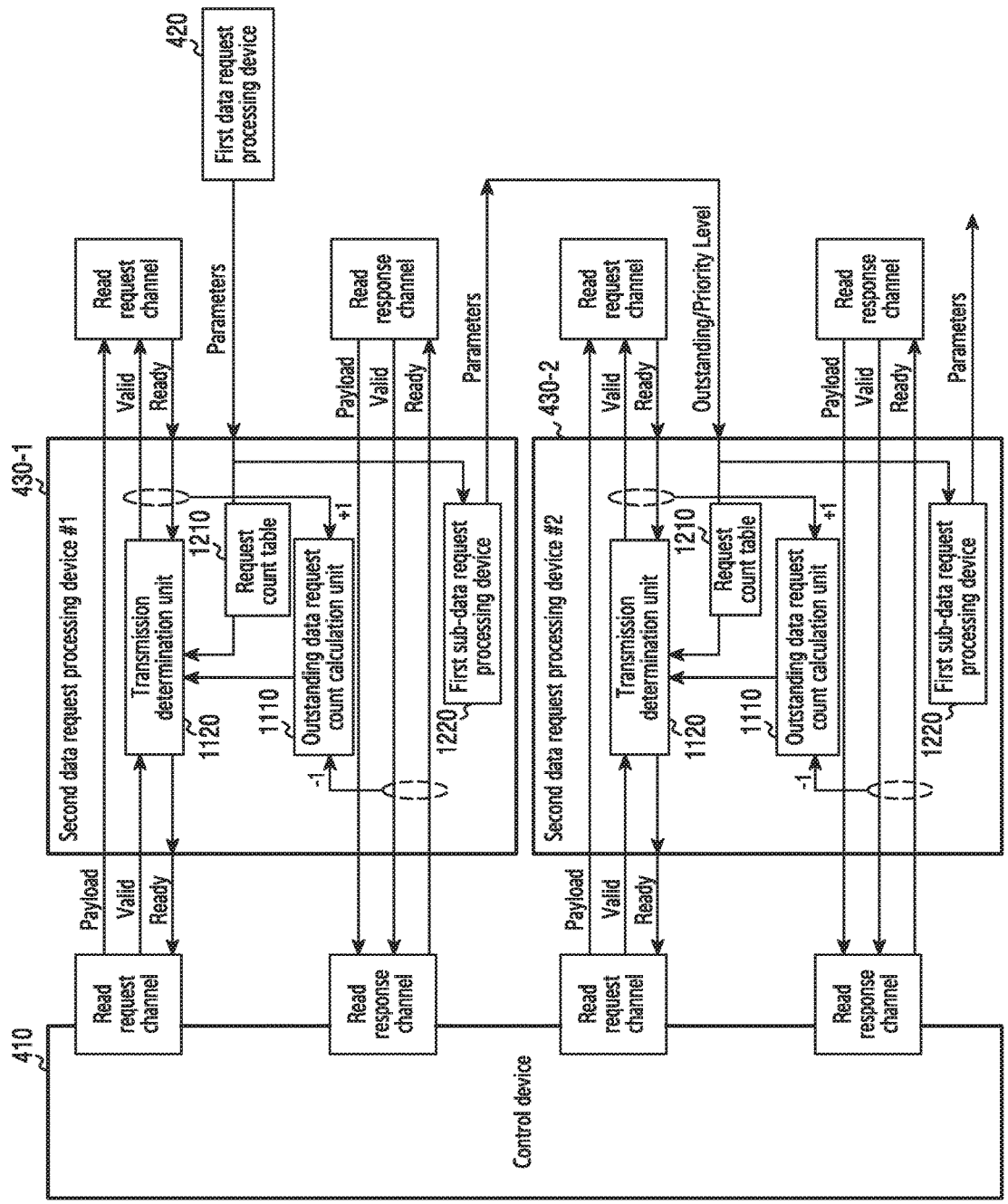
FIG. 13 illustrates a hardware configuration for a second data request processing device that controls a data request from a control device having a plurality of interfaces according to various embodiments.

FIG. 13 illustrates a hardware configuration for a second data request processing device that controls a data request from a control device having a plurality of interfaces according to various embodiments. The hardware configuration may be included in the second data request processing device 430 shown in FIG. 4. The second data request processing device 430 may be directly connected or operatively coupled to the first data request processing device 420 illustrated in FIG. 4.

Referring to FIG. 13, the control device 410 may include two interfaces. A second data request processing device 430-1 and a second data request processing device 430-2 may correspond to the second data request processing device 430 illustrated in FIG. 12. Internal components of the second data request processing device 430-1 and the second data request processing device 430-2 may respectively correspond to the internal components of the second data request processing device 430 illustrated in FIG. 12.

The first sub-data request processing device 1220 may be used to control a data request of each interface when one control device has a plurality of interfaces. The second first sub-data request processing device 1220 may transmit, to the second data request processing device 430-2, a parameter related to a data request generated from the second data request processing device 430-1. The second data request processing device 430-2 may calculate the number of outstanding data requests using the parameter related to the data request. In addition, the second data request processing device 430-2 may determine whether a data request is transmitted via a corresponding interface using the parameter related to the data request.

Figure 14:
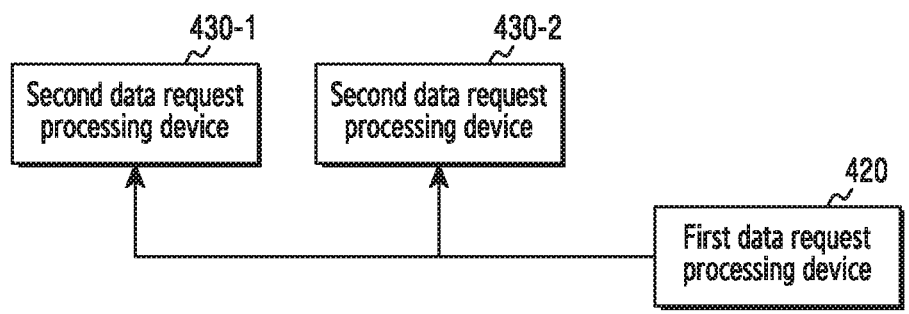
FIG. 14 illustrates another connection relationship between a first data request processing device and a second data request processing device according to various embodiments.

FIG. 14 illustrates another connection relationship between a first data request processing device and a second data request processing device according to various embodiments.

Referring to FIG. 14, the first data request processing device 420 and the second data request processing devices 430-1 and 430-2 may be connected in various forms. FIG. 14 shows an arrangement in which the first data request processing device 420 and the second data request processing devices 430-1 and 430-2 may share one physical signal. The first data request processing device 420 may transmit a parameter related to a data request to the second data request processing devices 430-1 and 430-2 using an identifier (ID).

Figure 15:
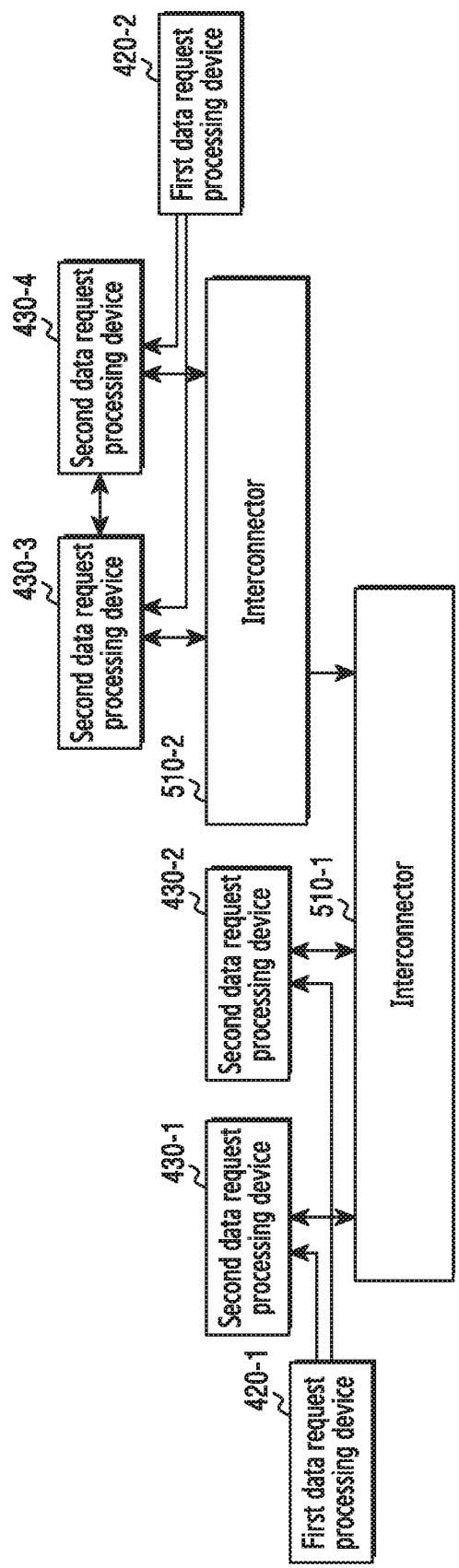
FIG. 15 illustrates a configuration including a plurality of first data request processing devices and a plurality of interconnectors according to various embodiments.

FIG. 15 illustrates a configuration including a plurality of first data request processing devices and a plurality of interconnectors according to various embodiments.

Referring to FIG. 15, a first data request processing device 420-1 may transmit a parameter related to a data request to second data request processing devices 430-1 and 430-2 connected to an upper interconnect 510-1.

A first data request processing device 420-2 may transmit a parameter related to a data request to second data request processing devices 430-3 and 430-4 connected to a lower interconnect 510-2. The lower interconnector 510-2 may transmit some or all of data requests generated from the second data request processing devices 430-3 and/or 430-4 to the upper interconnect 510-1.

As described above, a first device according to various embodiments may include: a transceiver configured to transmit or receive information; and a controller configured to be operatively coupled to the transceiver, wherein the controller may be configured to: receive state information on each of a plurality of control devices from each of the plurality of control devices requesting data from a storage device; determine a threshold value for an outstanding data request for each of the plurality of control devices on the basis of the received state information; and transmit the determined threshold value to at least one another device. The state information may include a deadline of a scenario corresponding to the requested data and a processing time of the requested data. The controller may be configured to: determine data request priorities of the plurality of control devices on the basis of the deadline of the scenario corresponding to the requested data and the processing time of the requested data; and determine a threshold value for each of the plurality of control devices on the basis of the determined data request priorities. The state information may further include configuration information on the control devices, and the controller may be further configured to determine a data request mode for each of the plurality of control devices on the basis of the received state information. The controller may be configured to: determine a first data request mode as a data request mode for a control device having a predefined setting among the plurality of control devices; determine a second data request mode as a data request mode for a control device other than the control device in the first data request mode among the plurality of control devices; determine a threshold value for the control device in the first data request mode to be a predefined value; determine a data request priority of the control device in the second data request mode on the basis of the deadline of the scenario corresponding to the requested data and the processing time of the requested data, and determine a threshold value for the control device in the second data request mode on the basis of the determined data request priority. The state information may further include storage information on a buffer included in each of the plurality of control devices, and the controller may be configured to determine the data request priority of the control device in the second data request mode on the basis of the storage information on the buffer, the deadline of the scenario corresponding to the requested data, and the processing time of the requested data.

Further, the controller may be configured to determine the threshold value for each of the plurality of control devices such that a deadline of a scenario controlled by some or all of the plurality of control devices is arranged on the basis of the state information.

As described above, a second device according to various embodiments may include: a transceiver configured to transmit or receive information; and a controller configured to be operatively coupled to the transceiver, wherein the controller may be configured to: receive a data request from a control device; determine whether to transmit the data request on the basis of information related to the data request received from another device; and transmit the data request to a storage device on the basis of a determination to transmit the data request, and the information related to the data request may be determined on the basis of state information on the control device. The information related to the data request may include a threshold value for the control device determined on the basis of the state information on the control device. The controller may further be configured to calculate a number of outstanding data requests of the data request, and may be configured to determine to transmit the data request when the number of outstanding data requests of the data request is less than the threshold value. The controller may further be configured to block transmission of the data request when the number of outstanding data requests of the data request is equal to or greater than the threshold value. The data request may be generated every set period, the threshold value may be updated every set period, and the controller may be configured to: increase the number of outstanding data requests of the data requests when the data request is blocked in a previous period; and decrease the number of outstanding data requests of the data request when the data request is transmitted in the previous period.

Further, the state information on the control device may include a deadline of a scenario corresponding to the requested data and a processing time of the requested data, a number of repetitions of the data request may be determined on the basis of a priority of the data request, and the priority of the data request may be determined on the basis of the deadline of the scenario corresponding to the requested data and the processing time of the requested data. The state information on the control device may further include configuration information on the control device, the threshold value may be determined: to be a predefined value when the control device is a control device in a first data request mode; and on the basis of the priority of the data request when the control device is a control device in a second data request mode, the priority of the data request may be determined on the basis of the deadline of the scenario corresponding to the requested data and the processing time of the requested data, the first data request mode may be a data request mode for a control device having a predefined setting, and the second data request mode may be a data request mode for a control device other than a control device in the first data request mode among a plurality of control devices. The state information on the control device may further include storage information on a buffer included in the control device, and the priority of the data request may be determined on the basis of the storage information on the buffer, the deadline of the scenario corresponding to the requested data, and the processing time of the requested data.

Further, the controller may be configured to transmit the data request to the storage device on the basis of a determination to transmit the data request according to an Advanced Extensible Interface (AXI) protocol of an Advanced Microcontroller Bus Architecture (AMBA).

Figure 16:
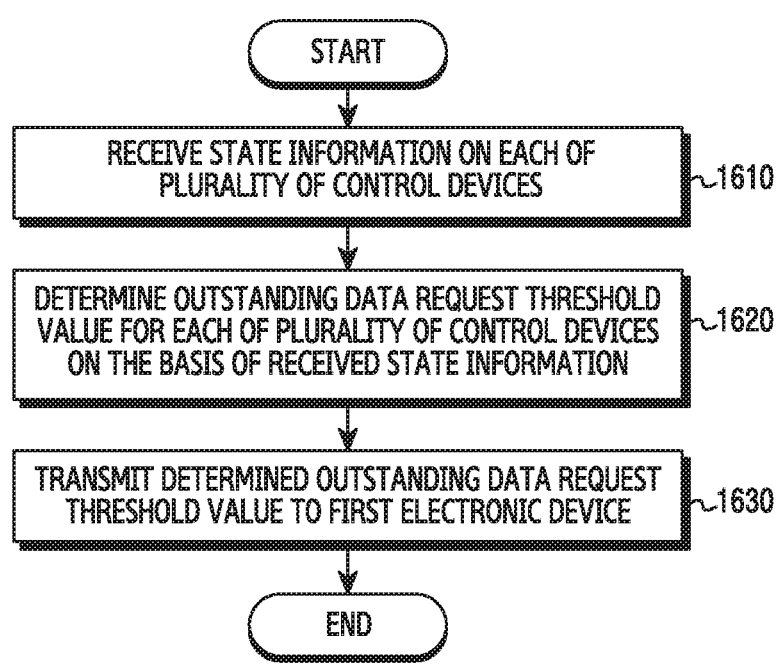
FIG. 16 is a flowchart illustrating the operation of a first data request processing device according to various embodiments.

FIG. 16 is a flowchart illustrating the operation of a first data request processing device according to various embodiments. The operation may be performed by the first data request processing device 420 illustrated in FIG. 4.

Referring to FIG. 16, in operation 1610, the first data request processing device 420 may receive state information on each of a plurality of control devices. The state information may include one or more of data request mode information on the plurality of control devices, the deadline of a scenario corresponding to a data request, the processing time of requested data, and storage information on a buffer included in the plurality of control devices.

In operation 1620, the first data request processing device 420 may determine an outstanding data request threshold value for each of the plurality of control devices on the basis of the received state information. The control device may request data several times in order to efficiently utilize the waiting time to receive the requested data. The outstanding data request threshold value may be a parameter for controlling this data request scheme. When the plurality of control devices simultaneously requests data a plurality of times, an electronic device may be overloaded due to increased complexity in processing the data requests, and thus a data outstanding data request threshold value may be required. The outstanding data request threshold value may be determined on the basis of the state information on the control devices according to a predetermined rule. The outstanding data request threshold value may be determined to correspond to a data request priority value generated on the basis of state information of the control devices. According to an embodiment, an operation of determining the outstanding data request threshold value may include an operation of determining a data request mode and an operation of determining a data request priority (or a priority among the control devices). Operation 1620 may be a pre-processing operation for the second data request processing device 430 illustrated in FIG. 4 to control a data request.

In operation 1630, the first data request processing device 420 may transmit the determined outstanding data request threshold value to a first electronic device. The first electronic device may be the second data request processing device 430. According to an embodiment, the first electronic device (or the second data request processing device 430) and the first data request processing device may be configured as a single device. In this case, operation 1630 may be omitted.

The first data request processing device 420 according to various embodiments may perform a pre-processing operation of determining an outstanding data request threshold value. Performing this operation can improve the scenario performance of an electronic device including the first data request processing device according to various embodiments (e.g., the electronic device 100 illustrated in FIG. 1) or a SoC including the first data request processing device (e.g., the SoC 400 illustrated in FIG. 4).

Figure 17:
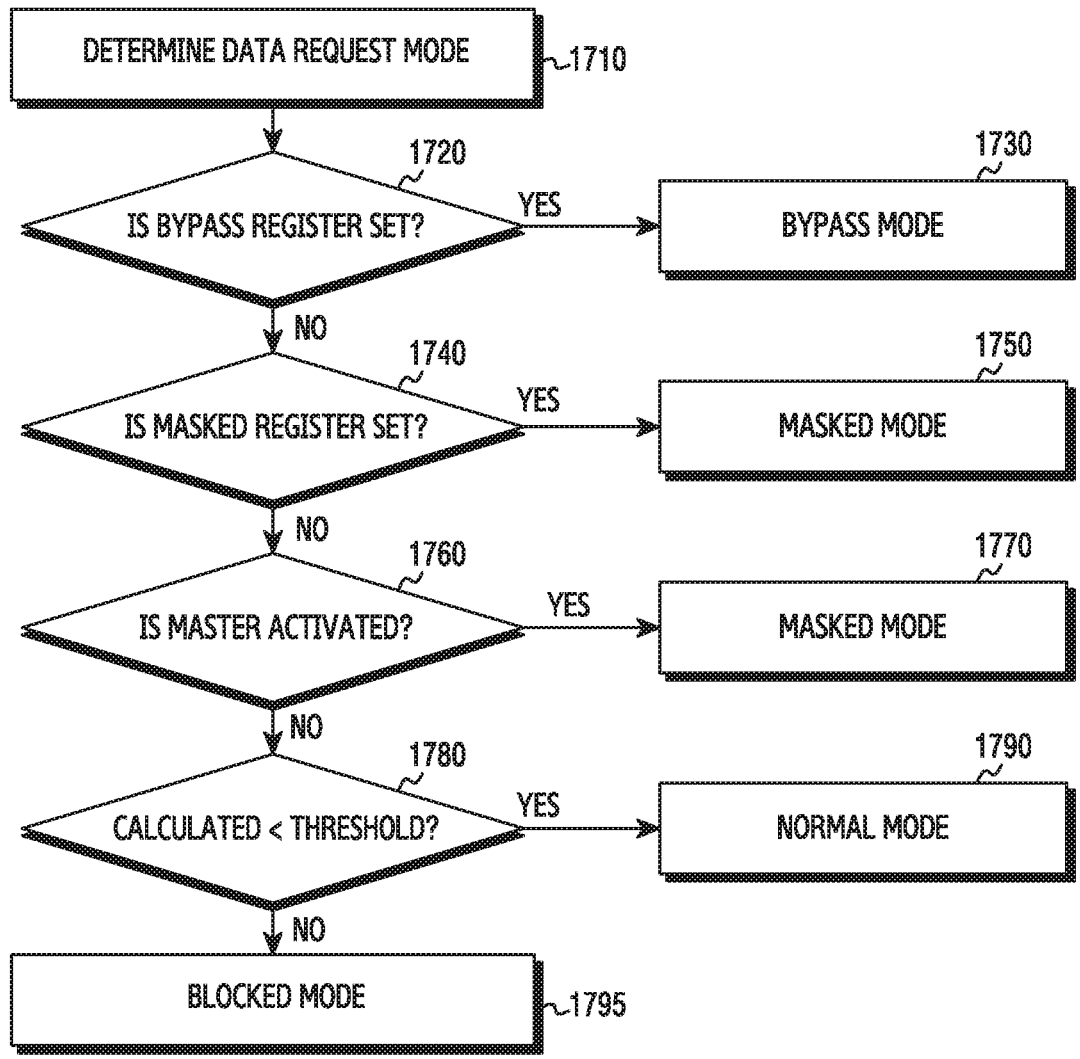
FIG. 17 is a flowchart illustrating an operation of determining a data request mode according to various embodiments.

FIG. 17 is a flow chart illustrating an operation of determining a data request mode according to various embodiments. The operation may be performed by the first data request processing device 420 illustrated in FIG. 4.

Referring to FIG. 17, in operation 1710, the first data request processing device 420 may determine a data request mode. The first data request processing device 420 may determine the data request mode on the basis of state information on a control device. The data request mode may include a general mode and a specific mode. The general mode may include a normal mode and a blocked mode. The specific mode may include a bypass mode and a masked mode. According to the embodiment, the operation of determining the data request mode may also be performed by each control device.

In operation 1720, the first data request processing device 420 may determine whether a corresponding data request has a bypass register set. When the data request has a bypass register set, the first data request processing device 420 may perform operation 1730. However, when the data request does not have a bypass register set, the first data request processing device 420 may perform operation 1740.

In operation 1730, the first data request processing device 420 may determine that the data request mode is the bypass mode. The bypass mode may be a mode in which the transmission of a data request is maximally approved. The bypass mode may have a high data request priority value or a high outstanding data request threshold value.

In operation 1740, the first data request processing device 420 may determine whether the data request has a masked register set. When the data request has a masked register set, the first data request processing device 420 may perform operation 1750. However, when the data request does not have a masked register set, the first data request processing device 420 may perform operation 1760.

In operation 1750, the first data request processing device 420 may determine that the data request mode is the masked mode. The masked mode may be a mode in which data transmission is minimally approved. The masked mode may have a low data request priority value or a low outstanding data request threshold value.

In operation 1760, the first data request processing device 420 may determine whether the control device (or master device) that has generated the data request is activated. The control device (or master device) not being activated may mean that data processing is not urgent. When the control device is activated, the first data request processing device 420 may perform operation 1770. However, when the control device is not activated, the first data request processing device 420 may perform operation 1780.

In operation 1770, the first data request processing device 420 may determine that the data request mode is the masked mode.

In operation 1780, the first data request processing device 420 may compare a predetermined threshold value with a value calculated on the basis of the processing time of requested data and the deadline of a scenario corresponding to the data request. This comparison operation is to control the data request by reflecting the relationship between the deadline and the processing time of the requested data, thereby improving the performance of the scenario. For example, suppose that the processing time of the requested data is 2, the time remaining until the deadline is 5, and the threshold is 1. In this case, the first data request processing device 420 may determine the calculated value to be 3 by subtracting 2 from 5. Since the calculated value (3) is greater than the threshold value (1), the first data request processing device may determine that it is not urgent to process the data request. In this case, the first data request processing device 420 may perform operation 1795. In another example, suppose that the processing time of the requested data is 2, the time remaining until the deadline is 2, and the threshold is 1. In this case, the first data request processing device 420 may determine the calculated value to be 0 by subtracting 2 from 2. Since the calculated value (0) is smaller than the threshold value (1), the first data request processing device may determine that it is urgent to process the data request. In this case, the first data request processing device 420 may perform operation 1790. According to an embodiment, operation 1780 may be omitted.

In operation 1790, the first data request processing device 420 may determine that the data request mode is the normal mode. The normal mode may refer to a data request mode in which the transmission of a data request is urgent.

In operation 1795, the first data request processing device 420 may determine that the data request is the block mode. The block mode may refer to a data request mode in which the transmission of a data request is not urgent.

The operation of determining the data request mode illustrated in operations 1710 through 1795 may be an operation considering the real-time states of control devices and a distribution between the control devices. The first data request processing device may perform a pre-processing operation including this operation, thereby improving the scenario performance of an electronic device (e.g., the electronic device 100 illustrated in FIG. 1) or a SoC including the first data request processing device (e.g., the SoC 400 illustrated in FIG. 4).

Figure 18:
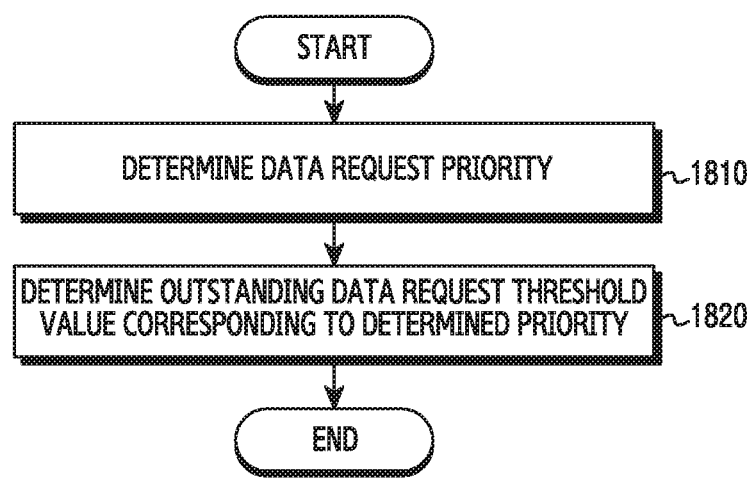
FIG. 18 illustrates an operation of determining a data request priority according to various embodiments.

FIG. 18 illustrates an operation of determining a data request priority according to various embodiments. The operation may be performed by the first data request processing device 420 illustrated in FIG. 4.

Referring to FIG. 18, in operation 1810, the first data request processing device 420 may determine a data request priority. The data request priority may be determined on the basis of state information on control devices. The state information may include the processing time of requested data of each control device and the deadline of a scenario corresponding to a data request. The first data request processing device 420 may determine whether data processing is urgent, considering the processing time and the deadline of the requested data. The operation of determining the urgency of data processing may be performed by comparing a predefined threshold value with a value calculated on the basis of the processing time and deadline of the data. When it is determined that data processing is urgent, the first data request processing device 420 may assign a relatively high priority for the data request. However, when it is determined that data processing is not urgent, the first data request processing device 420 may assign a relatively low priority for the data request.

In operation 1820, the first data request processing device 420 may determine an outstanding data request threshold value corresponding to the determined priority. Various mapping schemes may be applied to the operation of determining the outstanding data request threshold value on the basis of the priority. For example, the first data request processing device 420 may determine an outstanding data request threshold value by mapping a priority value based on a table, such as Table 1 illustrated above.

The operation of determining the outstanding data request threshold value on the basis of the priority illustrated in operations 1810 and 1820 may be an operation considering the real-time states of control devices and a distribution between the control devices. The first data request processing device may perform a pre-processing operation including this operation, thereby improving the scenario performance of an electronic device (e.g., the electronic device 100 illustrated in FIG. 1) or a SoC including the first data request processing device (e.g., the SoC 400 illustrated in FIG. 4).

Figure 19:
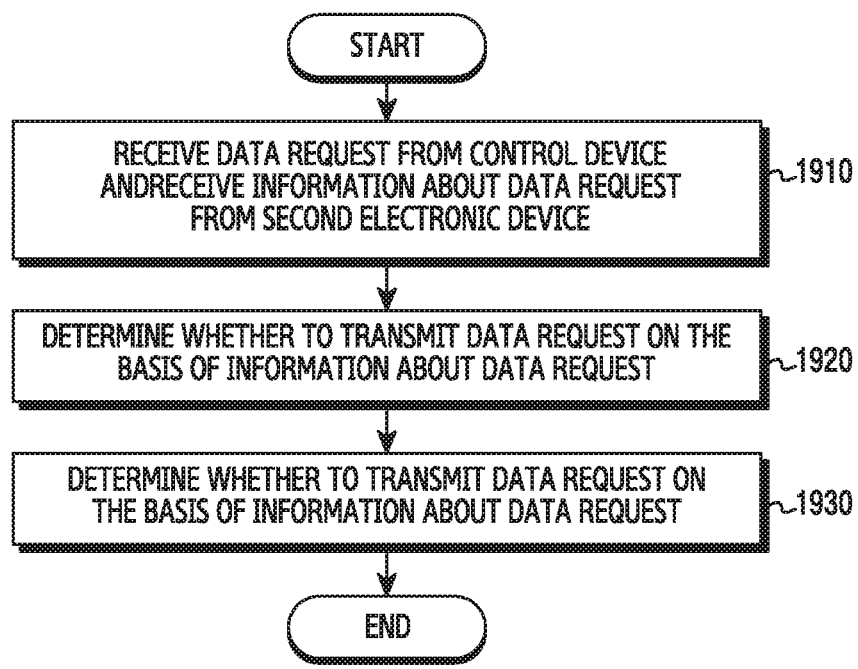
FIG. 19 is a flowchart illustrating the operation of a second data request processing device according to various embodiments.

FIG. 19 is a flowchart illustrating the operation of a second data request processing device according to various embodiments. The operation may be performed by the second data request processing device 430 illustrated in FIG. 4.

Referring to FIG. 19, in operation 1910, the second data request processing device 430 may receive a data request from a control device and may receive information related to the data request from a second electronic device. The second electronic device may be the first data request processing device 420 illustrated in FIG. 4. The information related to the data request may include parameters determined by the first data request processing device 420. For example, the parameters may include one or more of a data request priority and an outstanding data request threshold value.

In operation 1920, the second data request processing device 430 may determine whether to transmit the data request on the basis of the information related to the data request. For example, when the second data request processing device 430 determines that data processing is urgent on the basis of the information related to the data request, the second data request processing device 430 may determine to transmit the data request. However, when the second data request processing device 430 determines that data processing is not urgent on the basis of the information related to the data request, the second data request processing device 430 may determine to block the data request.

In operation 1930, the second data request processing device 430 may transmit the data request to a storage device according to the determination to transmit the data request. The transmission of the data request may be performed by directly transmitting the data request received from the control device. In addition, the transmission of the data request may be performed by transmitting, to the storage device, a signal corresponding to the data request received from the control device.

The second data request processing device 430 may control the data request on the basis of the state of the control device through the operation illustrated in operations 1910 to 1930. The second data request processing device may perform such an operation, thereby improving the scenario performance of an electronic device (e.g., the electronic device 100 illustrated in FIG. 1) or a SoC including the second data request processing device (e.g., the SoC 400 illustrated in FIG. 4).

Figure 20:
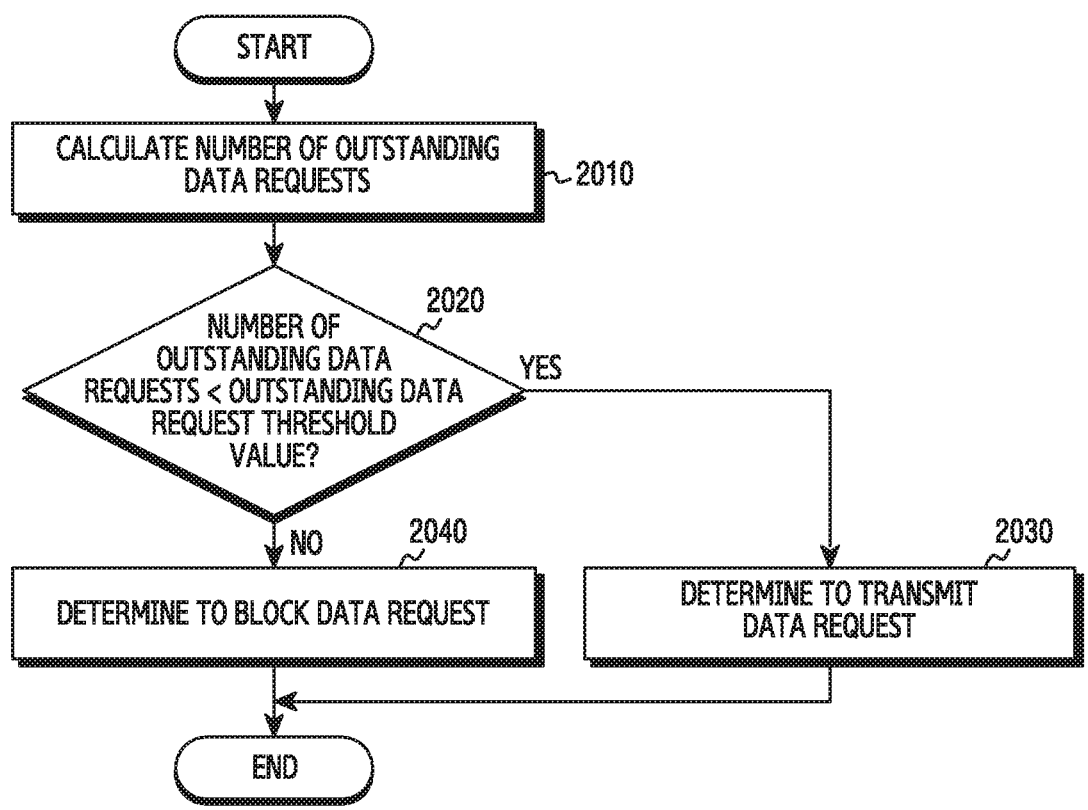
FIG. 20 is a flowchart illustrating an operation of determining whether to transmit a data request according to various embodiments.

FIG. 20 is a flowchart illustrating an operation of determining whether to transmit a data request according to various embodiments. The operation may be performed by the second data request processing device 430 illustrated in FIG. 4.

Referring to FIG. 20, in operation 2010, the second data request processing device 430 may calculate the number of outstanding data requests. A control device according to various embodiments may request data several times in order to efficiently utilize the waiting time after requesting the data. The number of outstanding data requests may refer to the number of delayed data requests among a plurality of data requests. The second data request processing device 430 may count the number of data transmissions via a read or write request channel and the number of data transmissions via a read or write response channel and may compare the difference between the numbers, thereby calculating the number of outstanding data requests. For example, when the number of data transmissions via a read request channel is 3 and the number of data transmissions via a read response channel is 1, the second data request processing device 430 may calculate the number of outstanding data request to be 2.

In operation 2020, the second data request processing device 430 may determine whether the number of outstanding data requests is less than an outstanding data request threshold value. The outstanding data request threshold value may be a value provided by the first data request processing device 420 illustrated in FIG. 4. When the number of outstanding data requests is less than the outstanding data request threshold value, the second data request processing device 430 may perform operation 2030. However, when the number of outstanding data requests is equal to or greater than the outstanding data request threshold value, the second data request processing device 430 may perform operation 2040.

In operation 2030, the second data request processing device 430 may determine to transmit the data request. The data request transmitted through the determination of transmission may be transmitted to a storage device or to an interconnector. Through the above operation, the second data request processing device 430 may transmit a data request that requires urgent processing.

In operation 2040, the second data request processing device 430 may determine to block the data request. Through the above operation, the second data request processing device 430 may block the transmission of a data request that does not require urgent processing.

Through operations 2010 to 2040, the second data request processing device 430 may improve the scenario performance of an electronic device (e.g., the electronic device 100 illustrated in FIG. 1) or a SoC including the second data request processing device (e.g., the SoC 400 illustrated in FIG. 4).

Figure 21:
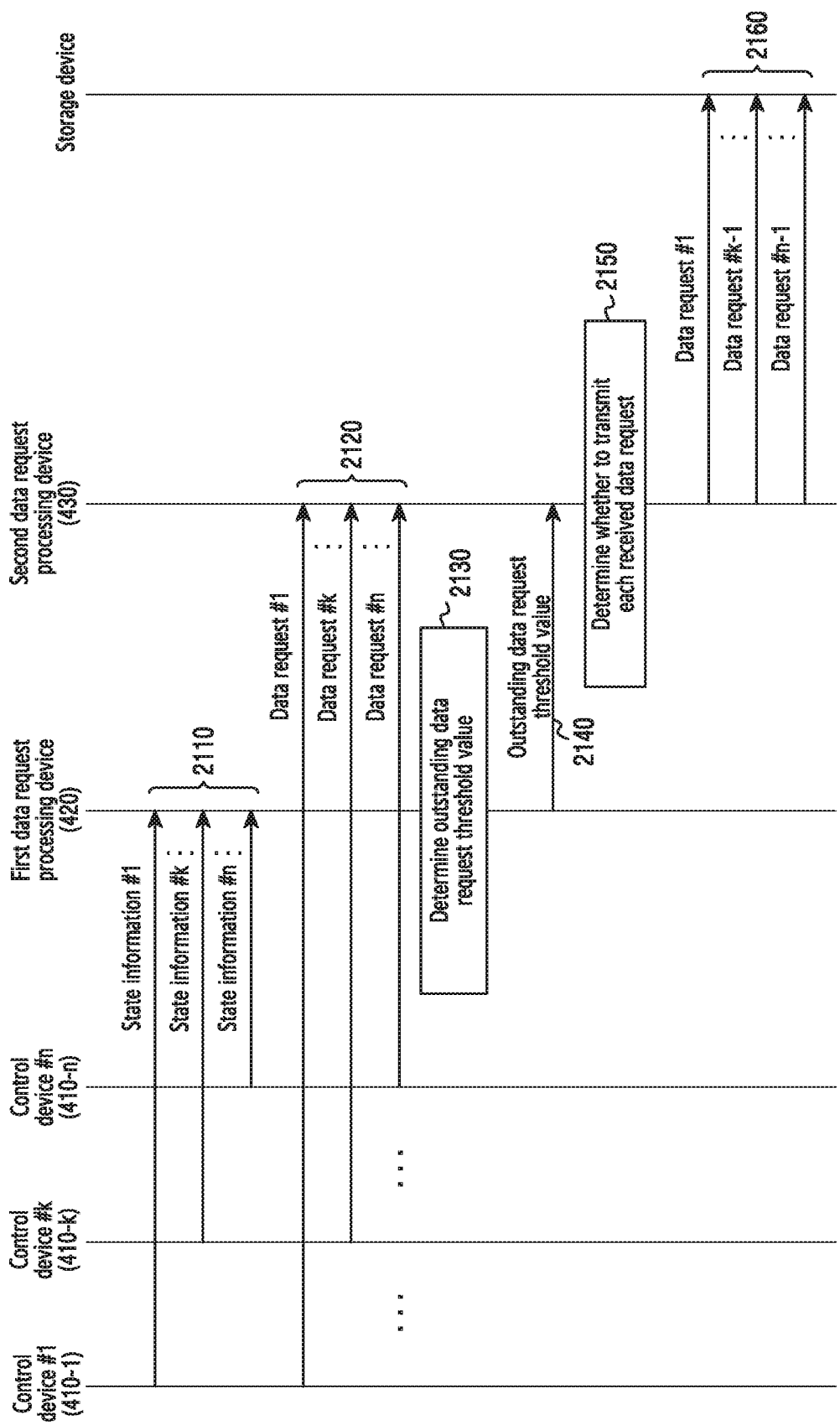
FIG. 21 illustrates signal flow in a SoC according to various embodiments.

FIG. 21 illustrates signal flow in a SoC according to various embodiments. This operation may occur in the SoC 400 illustrated in FIG. 4.

Referring to FIG. 21, in operation 2110, each of a plurality of control devices 410-1 to 410-n may transmit state information thereof to a first data request processing device 420. For example, a control device 410-1 may transmit state information #1 to the first data request processing device 420, a control device 410-k may transmit state information #k to the first data request processing device 420, and the control device 410-n may transmit state information #n to the first data request processing device 420.

In operation 2120, each of the plurality of control devices 410-1 to 410-n may transmit a data request to a second data request processing device 430. For example, the control device 410-1 may transmit a data request #1 to the second data request processing device 430, the control device 410-k may transmit a data request #k to the second data request processing device 430, and the control device 410-n may transmit a data request #n to the second data request processing device 430.

Operation 2110 and operation 2120 may be performed at the same time or in any order.

In operation 2130, the first data request processing device 420 may determine an outstanding data request threshold value in response to the reception of the state information.

In operation 2140, the first data request processing unit 420 may transmit the determined outstanding data request threshold value to the second data request processing unit 430.

In operation 2150, the second data request processing device 430 may determine whether to transmit each received data request on the basis of the received outstanding data request threshold value.

In operation 2160, the second data request processing device 430 may transmit, to a storage device 440, data requests determined to be transmitted. For example, the second data request processing device 430 may transmit data requests #1, #k−1, and #n−1 to the storage device. According to an embodiment, unlike in FIG. 21, the second data request processing device 430 may transmit, to the interconnectors 510 illustrated in FIG. 5, the data requests determined to be transmitted.

The above operations may control processing of a data request, thereby improving the scenario performance of an electronic device or a SoC. In addition, such operations may block inefficient transmission of a data request, thereby reducing the power consumption of the electronic device or a SoC.

As described above, an operation method of a first device according to various embodiments may include: receiving state information on each of a plurality of control devices from each of the plurality of control devices requesting data from a storage device; determining a threshold value for an outstanding data request for each of the plurality of control devices on the basis of the received state information; and transmitting the determined threshold value to at least one another device. The state information may include a deadline of a scenario corresponding to the requested data and a processing time of the requested data. The determining of the threshold value may include: determining data request priorities of the plurality of control devices on the basis of the deadline of the scenario corresponding to the requested data and the processing time of the requested data; and determining a threshold value for each of the plurality of control devices on the basis of the determined data request priorities. The state information may further include configuration information on the control devices, and the determining of the threshold value may further include determining a data request mode for each of the plurality of control devices on the basis of the received state information. The determining of the data request mode may include: determining a first data request mode as a data request mode for a control device having a predefined setting among the plurality of control devices; determining a second data request mode as a data request mode for a control device other than the control device in the first data request mode among the plurality of control devices; determining a threshold value for the control device in the first data request mode to be a predefined value; determining a data request priority of the control device in the second data request mode on the basis of the deadline of the scenario corresponding to the requested data and the processing time of the requested data; and determining a threshold value for the control device in the second data request mode on the basis of the determined data request priority. The state information may further include occupancy rate information on a buffer included in each of the plurality of control devices, and the determining of the data request priority of the control device in the second data request mode may include determining the data request priority of the control device in the second data request mode on the basis of the occupancy rate information, the deadline of the scenario, and the processing time of the requested data.

Further, the determining of the threshold value may include determining the threshold value for each of the plurality of control devices such that a deadline of a scenario controlled by some or all of the plurality of control devices is arranged on the basis of the state information.

As described above, an operation method of a second device according to various embodiments may include: receiving a data request from a control device; determining whether to transmit the data request on the basis of information related to the data request received from another device; and transmitting the data request to a storage device on the basis of a determination to transmit the data request, wherein the information related to the data request may be determined on the basis of state information on the control device. The information related to the data request may include a threshold value for an outstanding data request for the control device determined on the basis of the state information on the control device. The determining whether to transmit the data request may further include calculating a number of delays of the data request, and may include determining to transmit the data request when the number of delays of the data request is less than the threshold value. The determining whether to transmit the data request may further include blocking transmission of the data request when the number of delays of the data request is equal to or greater than the threshold value. The data request may be generated every set period, the threshold value may be updated every set period, and the calculating of the number of delays of the data request may include: increasing the number of delays of the data requests when the data request is blocked in a previous period; and decreasing the number of delays of the data request when the data request is transmitted in the previous period.

Further, the state information on the control device may include a deadline of a scenario corresponding to the requested data and a processing time of the requested data, a number of repetitions of the data request may be determined on the basis of a priority of the data request, and the priority of the data request may be determined on the basis of the deadline of the scenario corresponding to the requested data and the processing time of the requested data. The state information on the control device may further include configuration information on the control device, the number of repetitions of the data request may be determined: to be a predefined number when the control device is a control device in a first data request mode; and on the basis of the priority of the data request when the control device is a control device in a second data request mode, the priority of the data request may be determined on the basis of the deadline of the scenario corresponding to the requested data and the processing time of the requested data, the first data request mode may be a data request mode for a control device having a predefined setting, and the second data request mode may be a data request mode for a control device other than a control device in the first data request mode among a plurality of control devices. The state information on the control device may further include storage information on a buffer included in the control device, and the priority of the data request may be determined on the basis of the storage information on the buffer, the deadline of the scenario corresponding to the requested data, and the processing time of the requested data.

Further, the transmitting of the data request to the storage device on the basis of the determination to transmit the data request may include transmitting the data request to the storage device on the basis of a determination to transmit the data request according to an Advanced Extensible Interface (AXI) protocol of an Advanced Microcontroller Bus Architecture (AMBA).

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in nonvolatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method for operating a device, the method comprising:
receiving state information corresponding to each of a plurality of controllers from the plurality of controllers requesting data from a memory;
determining, by the device, a threshold value for a data request queued without response for the plurality of controllers on the basis of the received state information; and
transmitting the determined threshold value to at least one another device,
wherein the state information includes a time when an operation processed by the controllers is completed and a processing time of the requested data, and
wherein whether to transmit a plurality of data requests to the memory is based on the threshold value.

2. The method of claim 1, wherein the state information comprises a deadline of a scenario corresponding to the requested data and a processing time of the requested data.

3. The method of claim 2, wherein the determining of the threshold value comprises:
determining data request priorities of the plurality of controllers on the basis of the deadline of the scenario corresponding to the requested data and the processing time of the requested data; and
determining a threshold value for each of the plurality of controllers on the basis of the determined data request priorities.

4. The method of claim 3,
wherein the state information further comprises configuration information on the plurality of controllers, and
wherein the determining of the threshold value further comprises determining a data request mode for each of the plurality of controllers on the basis of the received state information.

5. The method of claim 4, wherein the determining of the data request mode comprises:
determining a first data request mode as a data request mode for a controller having a predefined setting among the plurality of controllers;
determining a second data request mode as a data request mode for a controller other than the controller in the first data request mode among the plurality of controllers;
determining a threshold value for the controller in the first data request mode to be a predefined value;
determining a data request priority of the controller in the second data request mode on the basis of the deadline of the scenario corresponding to the requested data and the processing time of the requested data; and
determining a threshold value for the controller in the second data request mode on the basis of the determined data request priority.

6. The method of claim 5,
wherein the state information further comprises occupancy rate information on a buffer comprised in each of the plurality of controllers, and
wherein the determining of the data request priority of the controller in the second data request mode comprises determining the data request priority of the controller in the second data request mode on the basis of the occupancy rate information, the deadline of the scenario, and the processing time of the requested data.

7. The method of claim 2, wherein the determining of the threshold value comprises determining the threshold value for each of the plurality of controllers such that a deadline of a scenario controlled by some or all of the plurality of controllers is arranged on the basis of the state information.

8. A device comprising:
a transceiver configured to transmit or receive information; and
at least one processor configured to be operatively coupled to the transceiver,
wherein the at least one processor is configured to:
receive state information corresponding to each of a plurality of controllers from each of the plurality of controllers requesting data from a memory,
determine, by the device, a threshold value for a data request queued without response for each of the plurality of controllers on the basis of the received state information, and
transmit the determined threshold value to at least one another device,
wherein the state information includes a time when an operation processed by the controllers is completed and a processing time of the requested data, and
wherein whether to transmit a plurality of data requests to the memory is based on the threshold value.

9. The device of claim 8, wherein the state information comprises a deadline of a scenario corresponding to the requested data and a processing time of the requested data.

10. The device of claim 9, wherein the at least one processor is further configured to:
determine data request priorities of the plurality of controllers on the basis of the deadline of the scenario corresponding to the requested data and the processing time of the requested data, and determine a threshold value for each of the plurality of controllers on the basis of the determined data request priorities.

11. The device of claim 10, wherein the state information further comprises configuration information on the plurality of controllers, and wherein the at least one processor is further configured to determine a data request mode for each of the plurality of controllers on the basis of the received state information.

12. The device of claim 11, wherein the at least one processor is further configured to:

determine a first data request mode as a data request mode for a controller having a predefined setting among the plurality of controllers, determine a second data request mode as a data request mode for a controller other than the controller in the first data request mode among the plurality of controllers, determine a threshold value for the controller in the first data request mode to be a predefined value, determine a data request priority of the controller in the second data request mode on the basis of the deadline of the scenario corresponding to the requested data and the processing time of the requested data, and determine a threshold value for the controller in the second data request mode on the basis of the determined data request priority.

13. The device of claim 12, wherein the state information further comprises storage information on a buffer comprised in each of the plurality of controllers, and wherein the at least one processor is further configured to determine the data request priority of the controller in the second data request mode on the basis of the storage information on the buffer, the deadline of the scenario corresponding to the requested data, and the processing time of the requested data.

14. The device of claim 9, wherein the at least one processor is further configured to determine the threshold value for each of the plurality of controllers such that a deadline of a scenario controlled by some or all of the plurality of controllers is arranged on the basis of the state information.

15. A device comprising:

a transceiver configured to transmit or receive information; and at least one processor configured to be operatively coupled to the transceiver, wherein the at least one processor is configured to:
receive a data request from a controller,
determine whether to transmit the data request on the basis of information related to the data request received from another device, and
transmit the data request to a memory on the basis of a determination to transmit the data request, and wherein the information related to the data request may be determined on the basis of state information on the controller, wherein the state information includes a time when an operation processed by controllers is completed and a processing time of the requested data, and wherein whether to transmit the data requests to the memory is based on a threshold value.

16. The device of claim 15, wherein the information related to the data request comprises a threshold value for the controller determined on the basis of the state information on the controller.

17. The device of claim 16, wherein the at least one processor is further configured to:

calculate a number of data requests queued without response, and determine to transmit the data request when the number of data requests queued without response is less than the threshold value.

18. The device of claim 17, wherein the data request is generated every set period, wherein the threshold value is updated every set period, and wherein the at least one processor is further configured to:
increase the number of data requests queued without response when the data request is blocked in a previous period, and
decrease the number of data requests queued without response when the data request is transmitted in the previous period.

19. The device of claim 16, wherein the state information on the controller further comprises:
a deadline of a scenario corresponding to the requested data and a processing time of the requested data, and
a number of repetitions of the data request is determined on the basis of a priority of the data request, and wherein the priority of the data request is determined on the basis of the deadline of the scenario corresponding to the requested data and the processing time of the requested data.

20. The device of claim 19, wherein the state information on the controller further comprises configuration information on the controller, wherein the threshold value is determined:
to be a predefined value when the controller is a controller in a first data request mode, and
on the basis of the priority of the data request when the controller is a controller in a second data request mode, wherein the priority of the data request is determined on the basis of the deadline of the scenario corresponding to the requested data and the processing time of the requested data, wherein the first data request mode is a data request mode for a controller having a predefined setting, and wherein the second data request mode is a data request mode for a other than the controller in the first data request mode among a plurality of controllers.

* * * * *